United States Patent [19]

Bhaskaran

[11] Patent Number: 4,949,388
[45] Date of Patent: Aug. 14, 1990

[54] METHOD AND APPARATUS FOR RECOGNITION OF GRAPHIC SYMBOLS

[75] Inventor: Parvathy Bhaskaran, Tempe, Ariz.

[73] Assignee: GTX Corporation, Phoenix, Ariz.

[21] Appl. No.: 16,253

[22] Filed: Feb. 19, 1987

[51] Int. Cl.$^5$ .............................................. G06K 9/00
[52] U.S. Cl. ........................................ 382/10; 382/1; 382/57; 364/518
[58] Field of Search ................... 382/1, 8, 10, 11, 21, 382/48, 57, 69; 364/200, 900, 518, 521, 488-491; 340/723

[56] References Cited

U.S. PATENT DOCUMENTS

| | | | |
|---|---|---|---|
| 4,377,849 | 3/1983 | Finger et al. | 364/491 |
| 4,388,610 | 6/1983 | Tsunekawa | 382/57 |
| 4,549,275 | 10/1985 | Sukonick | 364/518 |
| 4,651,284 | 3/1987 | Watanabe et al. | 364/491 |
| 4,701,860 | 10/1987 | Mader | 364/488 |
| 4,797,806 | 1/1989 | Krich | 382/41 |
| 4,803,477 | 2/1989 | Miyatake et al. | 340/723 |
| 4,813,013 | 3/1989 | Dunn | 364/521 |
| 4,817,187 | 3/1989 | Lien | 382/56 |
| 4,821,336 | 4/1989 | Roye | 382/56 |

OTHER PUBLICATIONS

Findler, N. V. et al., "Two Theoretical Issues Concerning Expert Systems", *IEEE*, 1985, pp. 236-240.
Erman, L. D., "The Hearsay-II Speech-Understanding System: Integrating Knowledge to Resolve Uncertainty", *Computing Surveys*, vol. 12, No. 2, Jun. 1980, pp. 213-253.

*Primary Examiner*—Leo H. Boudreau
*Assistant Examiner*—Jose L. Couso
*Attorney, Agent, or Firm*—Cahill, Sutton & Thomas

[57] ABSTRACT

A technique for recognizing hand-drawn graphic symbols operates on vectorized graphic data, including lines, arcs, and circles, that have been produced by an automatic drawing recognition system. The user creates segmented rule bases for recognizing various symbols by describing the geometric structures of recognizable symbols and subsymbols. The rule bases each are compiled into a respective decision tree. Fetched input vectors and entities are placed in software "blackboards", and more particularly, into appropriate symbol slots and subsymbol slots thereof. The growing symbols and subsymbols on the blackboards are continually restructured until they form closed loops or the blackboards are filled. The decision tree then is applied to all possible permutations of the symbols and/or subsymbols to accomplish partial or complete recognition. An inference engine subsystem controls application of the decision trees to limited bits of the symbols and subsymbols, matching decision subtree segment labels to attributes associated with the blackboard data, and orders the matched data according to degree of matching to effectuate application of the decision tree to the linked lists.

30 Claims, 13 Drawing Sheets

Microfiche Appendix Included
(3 Microfiche, 132 Pages)

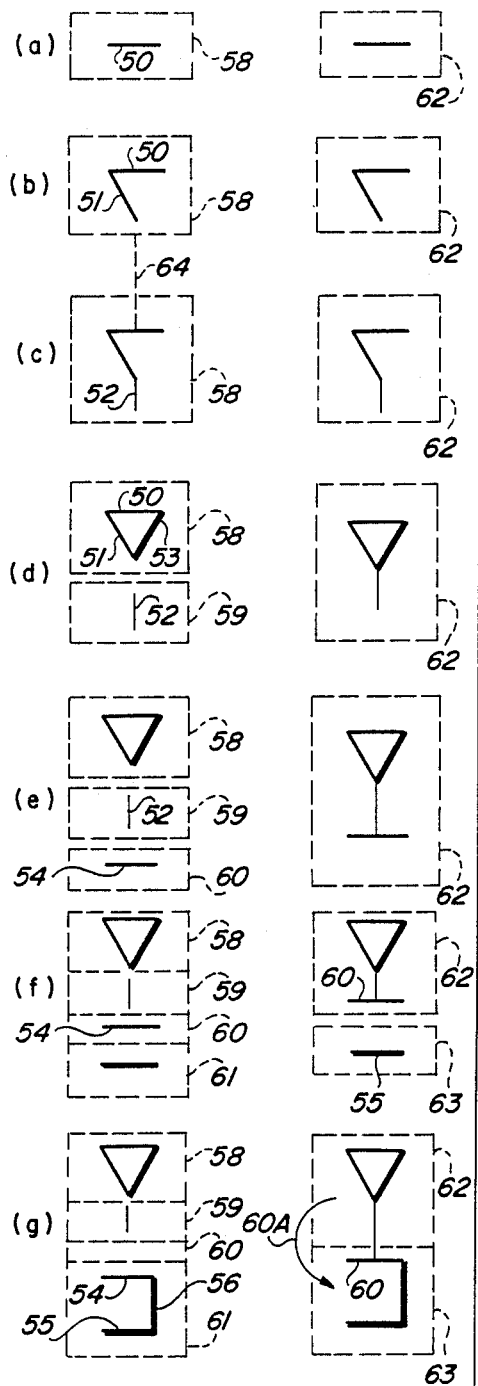
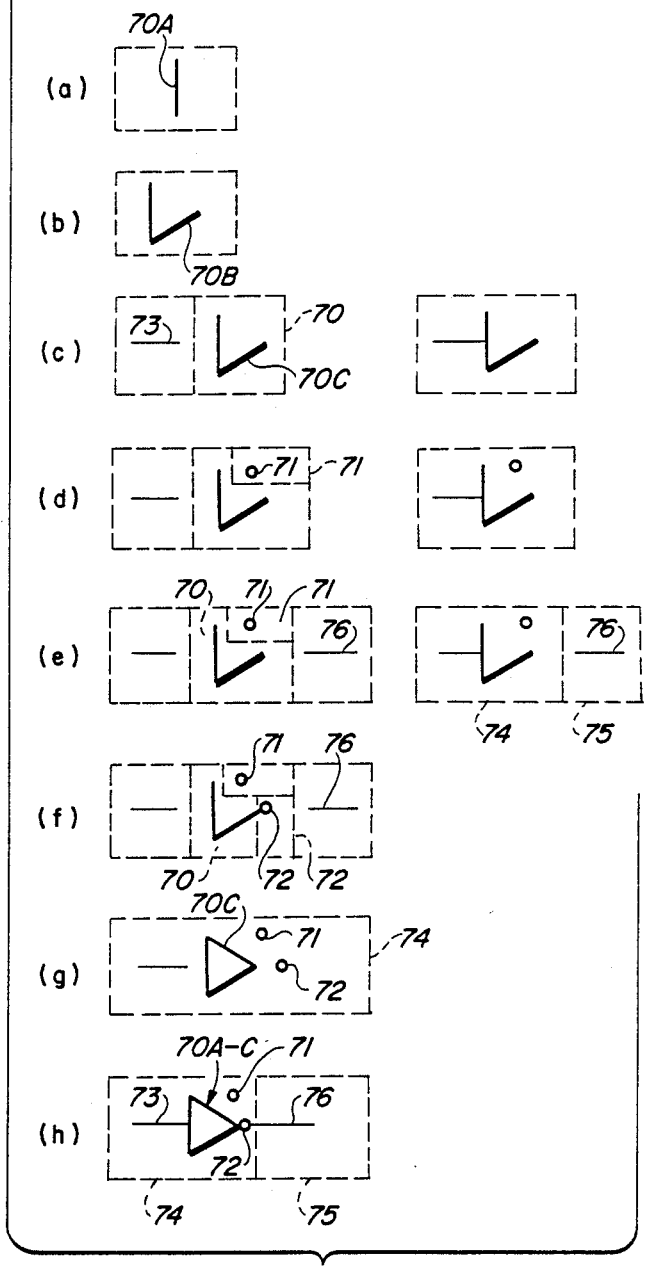
FIG. 13
FIG. 14

METHOD AND APPARATUS FOR RECOGNITION OF GRAPHIC SYMBOLS

Reference to microfiche appendix.

The application includes a microfiche appendix including three (3) sheets consisting of a total of 132 frames.

CROSS-REFERENCE TO RELATED APPLICATIONS

This application is related to copending applications "METHOD AND APPARATUS FOR SIMPLIFYING RUNLENGTH DATA FROM SCANNING OF IMAGES" by John M. Roye, Ser. No. 16,662, now U.S. Pat. No. 4,821,336 issued Apr. 11, 1989, "APPARATUS AND METHOD FOR VECTORIZATION OF INCOMING SCANNED IMAGE DATA" by Yih-Liang Lien, Ser. No. 16,660, now U.S. Pat. No. 4,817,187 issued Mar. 28, 1989, and "HIGH SPEED SERIAL PIXEL NEIGHBORHOOD PROCESSOR AND METHOD", by David M. Krich, Ser. No. 16,230, now U.S. Pat. No. 4,797,806 issued Jan. 10, 1989, commonly assigned, filed on even date herewith, and incorporated herein by reference.

BACKGROUND OF THE INVENTION

The invention relates to techniques for recognizing hand-drawn graphic symbols, and particularly to a technique utilizing previously vectorized data produced in response to electronic scanning of a drawing.

Many technical drawings of mechanical systems, electrical systems, and the like include large numbers of a wide variety of shapes or symbols, such as logic element symbols, electric circuit element symbols, and mechanical element symbols. Such symbols usually do not stand alone from other parts of the drawing, but are directly connected by lines to other symbols or parts of the drawing. In the development of a relatively low cost automatic drawing recognition system that can rapidly convert engineering drawings, hand-drawn technical diagrams, and the like to digital data that can be input to various CAD (computer aided design) systems, it would be very desirable to be able to automatically recognize such symbols in order to allow the system to efficiently refer to them by assigned codes which can be used to fetch corresponding symbols from stored symbol libraries, and thereby avoid the need to store and manipulate a much larger amount of digital data that would be completely descriptive of such symbols.

Quite a variety of work has been previously published in the field of character recognition. Prior character recognition systems involve statistical feature extraction and recognition techniques applied to relatively small, "isolated" characters that are not connected by dark lines to any other character or graphic structure. The prior character recognition techniques are not suitable for recognizing graphic symbols which are connected by dark lines to other symbols or graphic structures. Furthermore, conventional character recognition techniques require a great deal of computing time and memory space.

A prior technique referred to as a "blackboard" technique has been utilized in language recognition software systems. See "The Hearsay-II Speech-Understanding System: Integrating Knowledge to Resolve Uncertainty", by L. D. Erman, F. Hayes-Roth, V. Lesser and D. Reddy, "Computing Surveys 12", pages 213–253, 1980. Software "blackboards" are utilized as repositories for intermediate results to form labelled structures from sequentially received input data. The blackboard technique also has been applied to hypothesis formation techniques in building of so-called expert systems. For example, see "Two Theoretical Issues Concerning Expert Systems", IEEE International Conference on Systems, Man and Cybernetics, by Findler, N. V., and P. Bhaskaran, pp. 236–240, 1985.

Thus, there is an unmet need for an improved technique for recognizing graphic symbols which are directly connected to other objects on a drawing.

SUMMARY OF THE INVENTION

Accordingly, it is an object of the invention to provide a technique for recognizing relatively small graphic symbols which may be connected to other objects of a drawing, especially to other large objects.

It is another object of the invention to provide a symbol recognition system of the type referred to that operates on vectorized data in order to accomplish symbol recognition.

It is another object of the invention to provide a technique that reduces the effort required to generate symbol libraries for different graphic applications.

It is another object of the invention to provide a technique that minimizes the complexity of rule bases by means of which automatic recognition of graphic symbols can be accomplished.

It is another object of the invention to provide a flexible automatic graphic symbol recognition system.

Briefly described, and in accordance with one embodiment thereof, the invention provides a method and apparatus for recognizing hand-drawn graphic symbols that are connected to various other graphic symbols or graphic structures. In accordance with the invention, the user creates segmented rule bases for recognizing various symbols. The segmented rule bases include collections of sequential geometric tests representative of certain features of the graphic symbols to produce a "true" or a "false" outcome that points to the next such sequence of geometric tests to be performed. The decision rule base is converted into a decision tree having a plurality of nodes. A different sequence of geometric tests is associated with each node of the decision tree. A symbol indicator, which may be a null indicator, also is associated with each node, allowing a symbol identifier or guess variable to be updated as each sequence of tests is completed at that node of the decision tree. In accordance with the symbol recognition system of the present invention, a technical drawing or the like is operated on to produce vectorized graphic data for the entire drawing. The user can define rectangular, relatively small "windows" about each graphic symbol or closely spaced group of graphic symbols to be recognized. Vectors and other coded entities from within a window are fetched one at a time, from a vector table and placed into appropriate software "blackboards", and more particularly, into appropriate symbol slots and subsymbol slots thereof. The symbol recognition system selects a separate one of each of the software blackboards corresponding to each respective window, and only vectors corresponding to graphic structures within a window are fetched and inserted into a corresponding blackboard. The growing symbols and subsymbols in the blackboards are continually restructured until they form closed loops or the blackboards are filled. After each fetched vector or entity is inserted into a blackboard, subsymbol attributes are determined and compared to attribute "labels" of segments of the decision tree to determine if any segments of the decision tree match the attributes of the linked list, in order to determine if decision tree tests can be applied to the present linked list. If so, the various geometric tests associated with nodes of the selected segments of the decision tree are performed on the corresponding linked lists. The outcomes of the sequence of geometric tests determines which paths of the decision tree to traverse.

More specifically, in the described embodiment of the invention, after each vector is fetched from the vector table, it is inserted into a symbol slot of the appropriate blackboard, the symbol slot having locational parameters that correspond to the actual location of the vector. If such a symbol slot does not already exist in the blackboard, it is created and the vector is inserted into it. More precisely, each vector is inserted into a subsymbol slot within the selected symbol slot, and the vector is added to a linked list including any vectors already in that subsymbol slot. If no such symbol slot exists, one is created and the vector is entered into it to start the linked list. Each subsymbol slot inserted in a subsymbol slot is added to a linked list of other such subsymbol slots in that symbol slot. As the subsymbol structures grow in a blackboard, the system determines if portions of subsymbols in various other subsymbols slots in the same symbol slot are sufficiently close to each other to be merged, and also tests subsymbols in other symbol slots to determine if they can be "pulled" into the present symbol slot and merged with subsymbols therein. Each symbol slot and subsymbol slot corresponds to a portion of memory space allocated for that purpose. In the described embodiment of the invention, the operation of performing the sequences of geometric tests on portions of the linked list at successive nodes of the decision tree includes determining whether particular types of subsymbols included in a linked list occur more than once, and if so, determining the number of possible permutations of the recurring subsymbols. Each such permutation of the linked list is tested by means of the sequence of geometric tests applicable at that node until a "true" outcome is obtained. If no "true" outcome is obtained the system "backtracks" by applying the sequence of geometric tests to a "false" outcome of that decision tree node before determining that no guess as to the symbol type is made. If a symbol is recognized, a "guess" or "recognition" variable is updated, and ultimately output to a utilization program that uses the guess variable to access a stored symbol library that completely describes the recognized subsymbol. Dimensional information also is output to the utilization program to allow proper geometric scaling of the symbol accessed from the symbol library.

BRIEF DESCRIPTION OF THE DRAWINGS

FIG. 13 is a diagram showing steps in building a pair of symbols in a blackboard and recognize the symbols in accordance with the present invention.

FIG. 14 is a diagram illustrating a sequence of steps in building and recognizing a symbol that requires testing permutations of subsymbols.

DESCRIPTION OF THE INVENTION

Before describing the symbol recognition process of the invention, it will be helpful to first describe the overall automatic drawing recognition system in which the symbol recognition apparatus and technique of the present invention are incorporated It should first be noted that the present symbol recognition technique will find primary use in a computer graphics system that effectuates line-by-line scanning of a document such as a hand-drawn engineering drawing and receives the resulting data in a serial format in the form of a sequence of raw runlengths that each indicate the X coordinate of the last scanned black pixel in a string of connected black pixels, and the length of that string or "slice" of connected black pixels, and uses the vectorization technique of the above-referenced Lien application to produce a "vector table" including vectorized shapes and other coded entities.

Figure 11:
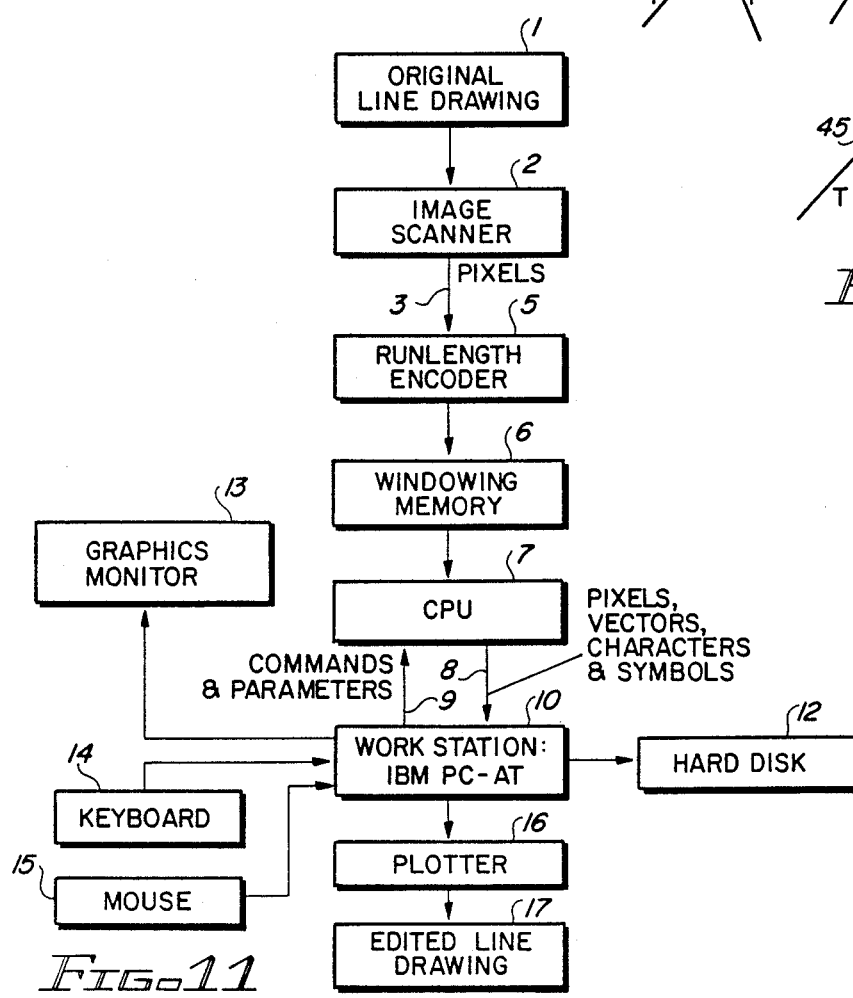
FIG. 11 is a diagram illustrating the automatic drawing recognition system in which the symbol recognition system of the present invention is incorporated.

The computer graphics system is generally shown in the diagram of FIG. 11, in which an original line drawing 1, typically an engineering drawing or the like, is scanned by a suitable image scanner 2, which outputs serial pixel data 3 into an "automatic drawing recognition system" (ADR) 4 that includes a runlength encoder 5, a windowing memory 6 that can be of the type described in the above-referenced copending Krich application, and a CPU 7, which can include a number of microprocessor chips, such as Motorola MC68020 integrated circuit microprocessors. The automatic drawing recognition system 4 simplifies the pixel data as subsequently described and produces pixels, vectors, recognized characters, and symbols as indicated by 9 to a workstation 10 including an IBM PC-AT desk top computer containing VERTICOM graphics boards, a high resolution graphics monitor 13, a keyboard 14, a mouse 15, and a hard disk 12.

Runlength encoder 4 is a relatively simple circuit that receives serial pixels from the scanner along with an end of line signal and an end of page signal, which are fed into a control circuit that generates an increment signal and a clear signal that are applied to a pixel counter that is incremented each time a new non-zero pixel code is received. The control circuit also generates an increment signal and a clear signal that are applied to a column counter circuit which is incremented every time a new pixel input signal is received. The clear signal to the pixel resets the pixel counter every time there is a transition from a string of connected black pixels to a white pixel, at which time the contents of the pixel counter are written into a FIFO buffer. The pixel counter also stores the length of the present string or "slice" of dark pixels resulting from scanning of an object on the document. The column counter clear signal is generated at the end of every row in response to the end of row signal. A write signal causes the contents of both the pixel counter and the column counter to be written into the FIFO buffer every time the end of a slice occurs or the end of a row occurs. The above-mentioned raw runlength data also indicate the end of each scanned line and the end of each scanned page. The raw runlength data is reorganized into linked lists that represent either (1) individual simple sections or (2) "blobs" of an "object". An "object" is an image surrounded entirely by white pixels.

The linked lists are filtered to eliminate insignificant white pixel gaps between the various slices in order to greatly reduce the number of slices. This is necessary because small, insignificant gaps that could result in accidental dividing of an intended slice into a number of shorter slices connected by one or two unintended white pixels frequently occur during scanning of a document.

The filtered linked lists are assembled into "geometrically" organized (1) "blob records" that contain all of the compact slice data and associated pointers needed for relating each "blob" to other blobs or trapezoids connected thereto, (2) "trapezoid records" that contain four corner points and associated points of shapes of the object that can be accurately represented by trapezoids and pointers to other blobs or trapezoids connected thereto, (3) convergence records, subsequently described, and (4) divergence records, subsequently described. The above-referenced copending Roye application describes in detail how to produce these records.

The vectorization technique of the above-referenced Lien application utilizes the foregoing records to "vectorize" the object. The output vectors and data in the "vector table" or VECGEN file produced by the vectorization technique of the above-referenced Lien application then can be loaded into a suitable data file that can be accessed by a computer aided design (CAD) system or the like to multiply dimensions by a scale factor, delete certain features, modify certain features, add features to create an updated file defining a modified or edited version of the original drawings or objects, etc. The edited file then can be utilized to redisplay or otherwise utilize the information representing the edited document.

The symbol recognition technique of the present invention utilizes the vectorized entities and coded shape entities in the VECGEN file to recognize certain user-defined symbols.

Figure 1:
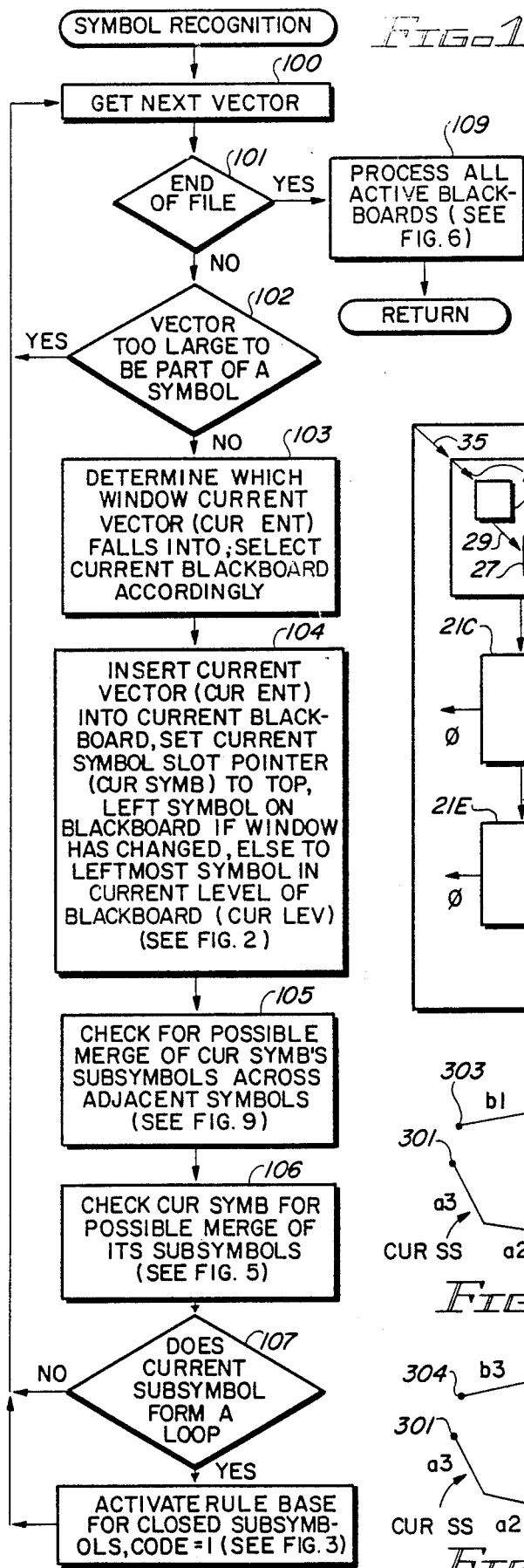
FIG. 1 is a general flow chart of the symbol recognition process of the present invention.

Referring now to FIG. 1, the flow chart shows the general symbol recognition program of the present invention. It indicates how "entities", including vectors, circles, arcs and other coded shapes fetched from the vector table are used to fill software "blackboards" and various "symbol slots" and "subsymbol slots" in the blackboards. The flow chart of FIG. 1 also indicates how the blackboards are processed to achieve symbol recognition after the blackboards have been filled. It should be noted that the term "vectors" will be used herein to refer to all vectorized entities and coded shapes which may be used in the symbol recognition process of the invention, including straight line vectors, arcs, and circles. Filled polygons and other coded entities and characters also will be recognized by future embodiments of the present invention.

The symbol recognition subroutine of FIG. 1 is called by the ADR processor 7 if the user has indicated that certain symbols in defined windows are to be recognized. The vector table (VECGEN) produced by the vectorizing program in the copending Louis Lien application has already been generated, so that all shapes on the original drawing have been vectorized. At this point, it should be noted that each fetched vector includes all of its parameters. For example a straight line vector includes its end points and thickness. An arc vector includes its two end points, an intermediate point, and its thickness. A circles includes its radius and center point. Other entities, such as a filled polygon, include all of the vertices thereof.

Figure 2B:
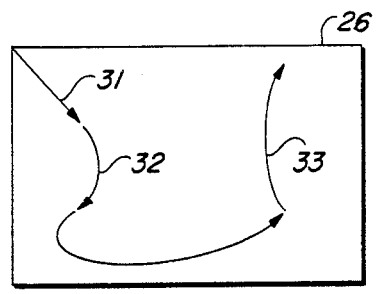
FIGS. 2A and 2B are diagrams illustrating a blackboard, a symbol slot of a blackboard, and subsymbol slots in a symbol slot.
Figure 2A:
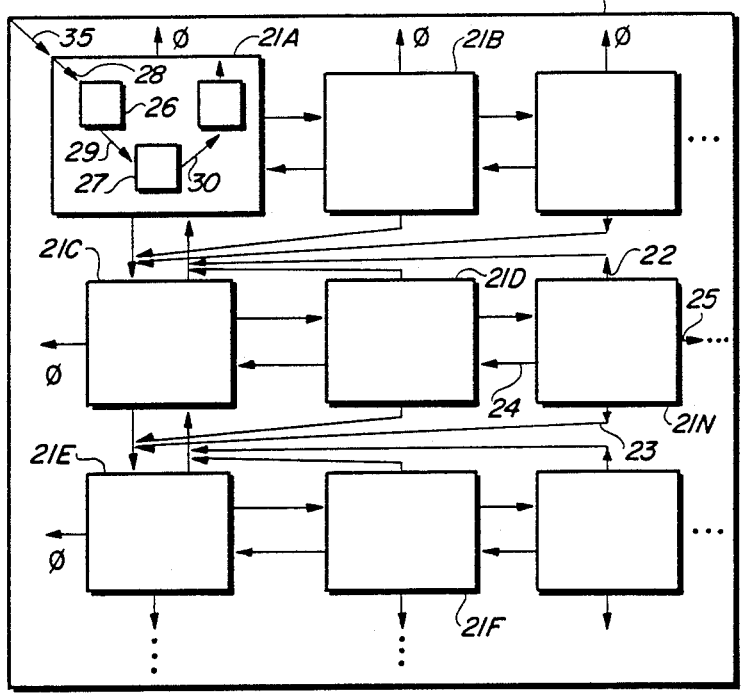

At this point, it should also be appreciated that the user who is scanning a technical drawing or the like may recognize on it various "standard" features that he knows can be represented as symbols. The user defines rectangular windows around groups of symbols that may be different from each other by their size. In the ADR system described herein and in the above-referenced copending patent applications, a control or "manager" program supplies the user with various menu selections that enable the user by means of prompt instructions to define rectangular windows around selected parts of the drawing, and define up to eight such windows, automatically determining size and location The symbol recognition program defines a "blackboard" corresponding to each such user-defined window. In FIGS. 2A and 2B, reference numeral 20 represents such a blackboard. Blackboard 20 may include a number of "symbol slots" such as 21A-E. Each symbol slot 21 includes an up pointer such as 22, a left of pointer such as 24, a down pointer such as 23, and a right of pointer such as 25, which point to other symbol slots that are above, to the left of, below, and to the right of symbol slot 21, respectively, as shown. As indicated in FIG. 2A, each of the up pointers in a row of subsymbols points to the leftmost symbol slot in the row above that slot. The down pointer of each of the symbol slots in a particular row points to the leftmost symbol slot of the following row. Each of the pointers that is adjacent to a boundary of the blackboard is a null pointer. A blackboard pointer such as 35 points to the upper left-hand symbol slot of the blackboard.

Each symbol slot such as 21 includes a number of "subsymbol slots" such as 26 and 27. These subsymbol slots and symbol slots become defined as the symbol recognition program is executed As shown in FIG. 2A, each subsymbol slot such as 26 is pointed to by a subsymbol slot pointer such as 28 from the upper left-hand corner of its symbol slot. A pointer such as 29 points from subsymbol slot 26 to subsymbol slot 27 which in turn points to the next subsymbol slot. Thus, within each symbol slot, the subsymbol slots therein form a linked list.

Referring back to FIG. 1, the program goes to block 100 and fetches the next vector or entity from the vector table, and goes to decision block 101. In block 101, the program determines if all vectors have been fetched from the vector table, and if so, goes to block 109, subsequently described.

If the end of the vector table has not been reached, the program goes to decision block 102 and determines if the present vector is too large to be part of a symbol. For example, if the vector is larger than a maximum size specified by the user, this determination will be affirmative, and the program returns to block 100. If the present vector is small enough to be part of a recognizable symbol, the program goes to block 103 and determines which of a number of "windows" or "blackboards" that the current vector or entity falls into by virtue of its size and location. It does this by calling the subroutine of FIG. 6A and resetting the blackboard.

The program in accordance with block 103 selects which "current blackboard" corresponds to the location on the original drawing of the present vector, and selects that blackboard. The program then goes to block 104 and inserts the current vector, which is pointed to by the pointer CUR ENT, into the current blackboard, sets a current symbol slot pointer CUR SYMB to point to the top left symbol slot on that blackboard, if the window number has changed since the last fetched vector. Otherwise, CUR SYMB points to the leftmost symbol slot of the current level in the blackboard.

More specifically, in block 104, which is described in greater detail later with reference to FIG. 2, individual vectors such as 31, 32 ... 33 (FIG. 2B) are sequentially or otherwise individually placed into a subsymbol slot 26.

After the present vector or current entity has been properly positioned into a subsymbol slot in the present blackboard, the program goes to block 105 and checks to determine if it is possible to "merge" the present subsymbol with another subsymbol in an adjacent symbol slot. This process is described in detail with reference to FIG. 9 later. If such a merge is possible, the subroutine of block 105 in effect "pulls" the mergable subsymbol from the adjacent symbol slot into the present symbol slot and erases it from the adjacent symbol slot.

The program then goes to block 106 and determines if it is possible to merge subsymbols in the present symbol slot, and if it is possible, performs the merging of subsymbols in accordance with FIG. 5, subsequently described. Generally, merging of symbols or subsymbols is possible if certain portions thereof are physically sufficiently close.

At this point, it is to be understood that each blackboard is in a continual state of change as new vectors are fetched from the vector table and it becomes more evident which subsymbols and symbols can be merged as new vectors or entities are added to subsymbol slots in the various blackboards.

The software variable CUR LEV points to the level of the present row of symbol slots in the present blackboard.

The symbol recognition program goes from block 106 to decision block 107 and determines if the current subsymbol forms a loop within the present subsymbol slot. For example, in FIG. 2B, if additional individual vectors are added to the subsymbol in subsymbol slot 26 so as to form a closed loop, the determination of decision block 107 will be affirmative, and the program would go to block 108 and activate a decision tree compiled from a rule base for closed subsymbols, as subsequently explained with reference to FIG. 3. The program goes from block 108 back to block 100 to fetch the next vector or entity, if there is one from the VECGEN file. If the determination of decision block 107 is negative, the program simply fetches the next vector in block 100.

Each symbol slot can have entered therein as many subsymbol slots as are needed to contain the vectors and/or entities that form a subsymbol or symbol. Note that subsymbols are formed by continuously adding entities, whereas symbols can be formed by unjoined subsymbols. Each subsymbol slot includes a linked list of such vectors and/or entities. The last subsymbol slot in a particular symbol slot has an associated "null pointer" that indicates the end of the linked list. Each subsymbol slot includes an initial pointer to the first entity or vector in that subsymbol slot.

The above process continues until all vectors or entities in the VECGEN table have been checked, and if possible entered into appropriate subsymbol slots of appropriate symbol slots. Entered vectors or entities are merged as appropriate during the process of filling the blackboards. Those subsymbols which are closed during the filling of the blackboards are recognized first, as later indicated in FIG. 1. After the blackboards have been filled, further processing takes place in accordance with FIG. 6 to recognize other subsymbols and symbols.

Figure 2:
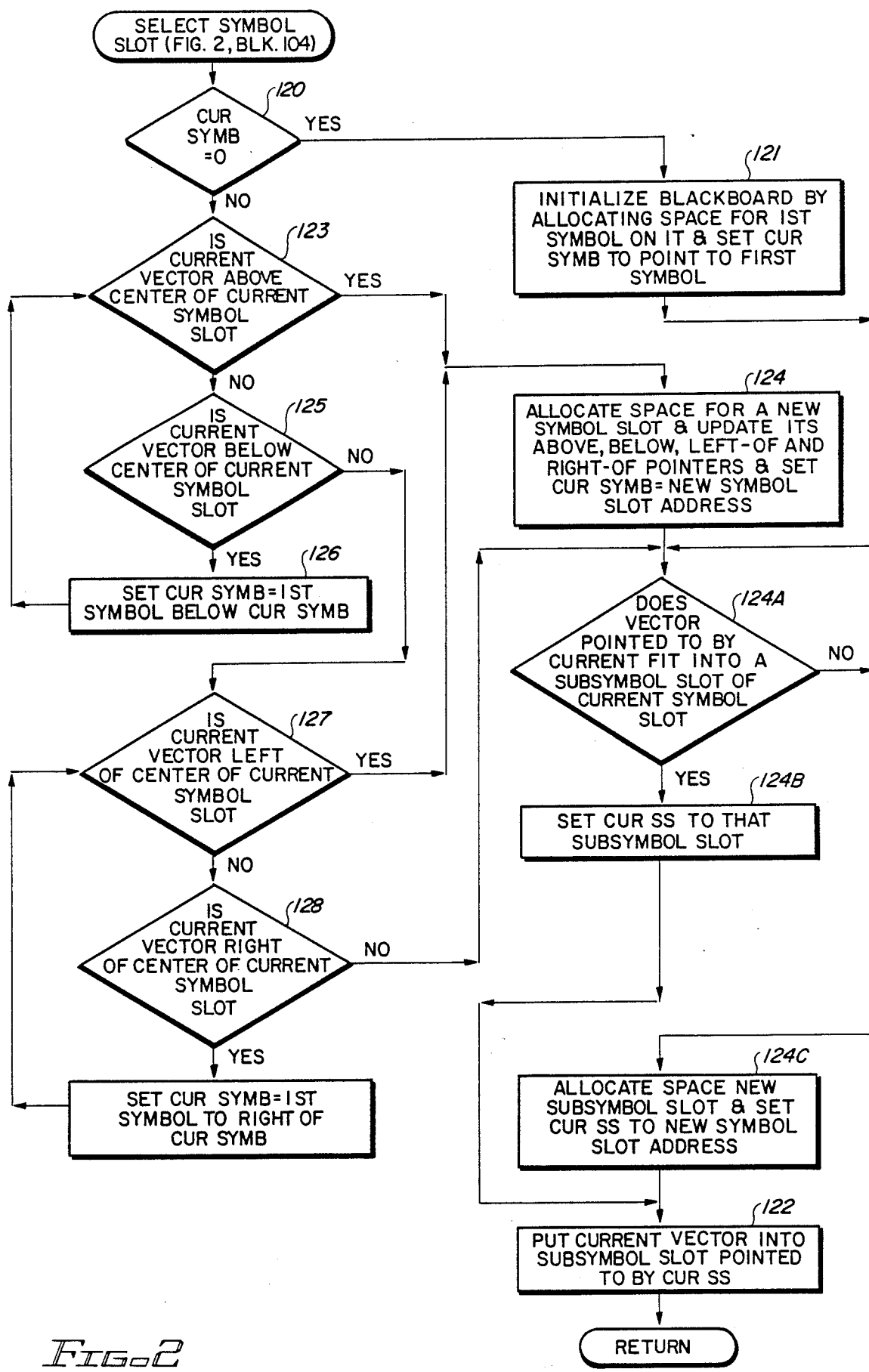
FIG. 2 is a flow chart of a subroutine corresponding to block 104 of FIG. 1.

Referring next to FIG. 2, the procedure of inserting the current vector or entity into a current blackboard will be described. CUR SYMB points to the leftmost symbol slot at the CUR LEV level if blackboards have not been switched for the current entity, or else it is set to the leftmost symbol slot at the topmost level of the blackboard. This subroutine first goes to decision block 120 and determines if CUR SYMB, the pointer to the current subsymbol slot, is zero. If it is, the present blackboard is empty, so it is necessary to initialize it by allocating appropriate memory space for the first symbol slot therein and setting CUR SYMB to point to it, as indicated in block 121 Next, the subroutine goes to decision block 124A and determines if the vector pointed to by CUR ENT fits into an existing subsymbol slot of the current symbol slot pointed to by CUR SYMB. If this determination is affirmative, the subroutine goes to block 124B and simply sets CUR SS, the current subsymbol slot pointer, to that preexisting subsymbol slot, and then goes to block 122 and puts the current vector into that subsymbol slot. If the determination of block 124A is negative, the subroutine goes to block 124C and allocates memory space for a new subsymbol slot, adds it to the end of the linked list of subsymbols for the symbol slot, and sets CUR SS to the new subsymbol slot address, and goes to block 122, puts the current vector into the new subsymbol slot address, and returns.

If the present vector is not the first entry into the blackboard, the program goes to decision block 123 and determines if the current vector is located "above" the current symbol slot, i.e., if the current vector is located a predetermined distance above the center of the current symbol slot (depending upon the maximum symbol size). If this determination is affirmative, it means that a new level needs to be created above the present level, and the subroutine goes to block 124, allocates memory space for a new symbol located above the one presently pointed to by CUR SYMB, and also updates the above, below, left of, and right of pointers of the new symbol slot, and also updates the above and below pointers of the symbol slots in the row directly above the current symbol slot and in the row immediately below the current symbol slot, and sets CUR SYMB equal to the address of the new symbol slot. The program then goes to block 124, previously described, and puts the current vector into the correct new symbol and subsymbol slot.

It should be noted that in essence, the subroutine of FIG. 2 "looks" at the current vector and follows a "trail" of linked symbols to reach a correct current position, and thereby determines the correct symbol slot into which to put the present vector.

If the determination of block 123 is negative, the subroutine goes to decision block 125 and determines if the current vector is located "below" the center of the current symbol slot, i.e., a predetermined distance below the center of the current symbol slot.

If the determination of decision block 125 is affirmative, the subroutine goes to block 126 and sets CUR SYMB equal to the address of the first symbol slot below the one presently pointed to by CUR SYMB, and returns to block 123.

If the determination of decision block 125 is negative, it means that the subroutine has found the correct level, and so the subroutine goes to block 127 and determines if the current vector is located to the "left" of the current symbol slot. If this determination is affirmative, it is necessary to go to block 124, and create a new symbol slot to the left of the current one and set CUR SYMB to the new symbol slot address, and put the current vector into an appropriate subsymbol slot of that symbol slot.

If the determination of decision block 127 is negative, the program goes to decision block 128 and determines if the current vector is located to the right of the current symbol slot. If this determination is affirmative, CUR SYMB is set to point to the first symbol to the right of that current symbol slot, and returns to block 127. If the current vector is not located to the right of the current symbol slot, the subroutine goes to block 124A and puts the current vector into an appropriate existing or new subsymbol slot, and returns.

Figure 9:
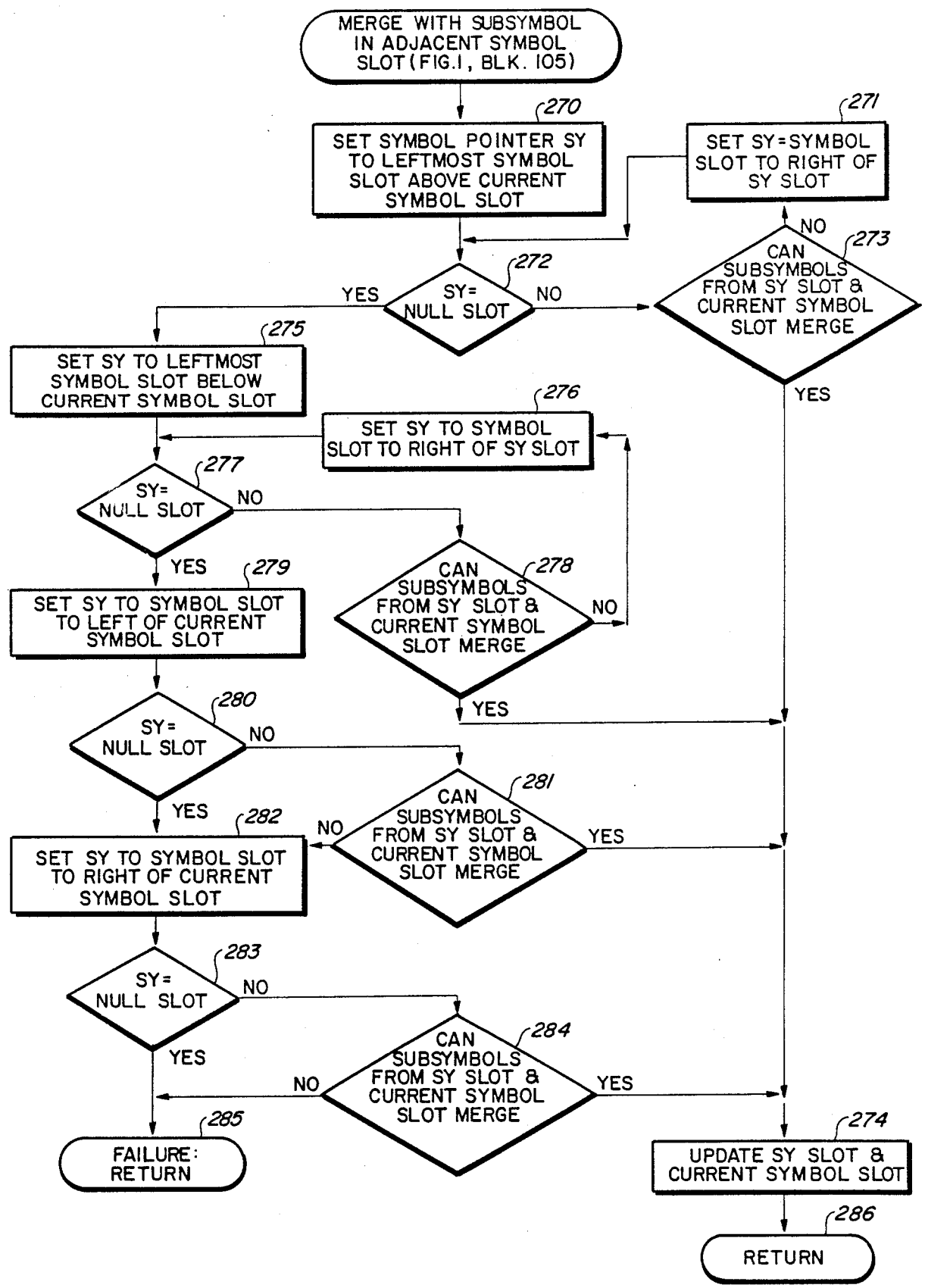
FIG. 9 is a flow chart of a subroutine corresponding to block 106 of FIG. 1.

Perhaps, it would be best to next describe the flow chart of FIG. 9, which corresponds to block 106 in FIG. 1, wherein the subroutine checks to determine if subsymbols in the current symbol slot might possibly be merged with subsymbols in adjacent symbol slots. This subroutine is executed before the merging subroutine of FIG. 5, because, in effect, if there is a subsymbol in an adjacent symbol slot that is close enough to be merged with a subsymbol in the current symbol slot, then the subsymbol from the adjacent symbol slot is "pulled into" the present symbol slot, making it more convenient to then accomplish merging in accordance with the subroutine of FIG. 5, described later.

First, the subroutine goes to block 270 and sets a symbol pointer SY to the leftmost symbol slot above the current symbol slot. The subroutine then goes to decision block 272 and determines if SY is equal to zero, i.e., is a "null" pointer. The subroutine goes to decision block 273 and determines if subsymbols from the symbol slot pointed to by SY can be merged with the current symbol slot. If this determination is negative, the subroutine goes to block 271 and sets the pointer SY to point to the symbol slot to the right of the current symbol slot, and returns to decision block 272.

If the determination of decision block 273 is affirmative, the subroutine goes to block 274 and accordingly, updates both the symbol slots pointed to by SY and the CUR SYMB, and returns via label 286.

The process of block 274 includes subtracting subsymbols from the adjacent symbol slot that (the one pointed to by SY) are moved into the present symbol slot (pointed to by CUR SYMB) because they are mergable with subsymbols in the present symbol slot. That includes decrementing the number of subsymbols in the adjacent symbol slot and incrementing the number in the current symbol slot.

If the determination of decision block 272 is affirmative, this means that the current symbol slot is the leftmost uppermost symbol slot in the present blackboard or that there are no more symbol slots to check above the current symbol slot's level If this is the case, the subroutine goes to block 275 and sets the symbol pointer SY to the leftmost symbol slot below the current symbol slot. The subroutine then goes to decision block 277 and determines if the symbol pointer SY is zero. If it is, it means that there is no level below the current symbol level. If the determination of decision block 277 is negative, the level below the current level, so the subroutine goes to block 278 and determines if any subsymbols from the symbol slot pointed to by SY and the current symbol slot pointer CUR SYMB can be merged, and if this determination is affirmative, the appropriate pointers are updated in decision block 274 to move mergable subsymbols from the adjacent symbol slot into the one pointed to by CUR SYMB. Otherwise, the subroutine goes from block 278 to 276, sets SY to point to the symbol slot to the right, and returns to block 277. In each of decision blocks 277, 280 and 282, note that the subroutine looks to the right until it encounters a null pointer. Block 272 first looks up to block 270 to determine if there is a level above the current level and if there is not then it looks to symbol slots to the right to attempt to draw or pull in mergable entities.

If the determination of block 277 is affirmative, the subroutine goes to block 279, sets SY to the symbol slot to the left of the current symbol slot, and goes to decision block 280. Decision block 280 determines if there is no symbol slot to the left. If this determination is negative, the subroutine goes to decision block 281, which determines if any subsymbols from the symbol slot pointed to by SY and the current symbol slot pointed to by CUR SYMB can be merged, and if they can, goes to block 274 and updates the pointers of the symbol slot pointed to by SY and the current symbol slot pointed to by CUR SYMB to effectively move mergable subsymbols to the current symbol slot from the one pointed to by SY, and returns. If the determination of block 281 is negative, the subroutine goes to block 282, as is the case if the determination of block 280 is affirmative. In block 282, the subroutine sets SY to point to the symbol slot to the right of the current symbol slot pointed to by CUR SYMB, and goes to decision block 283 and determines if SY is now equal to zero.

If this determination is affirmative, it means there has been a failure to merge any subsymbols from any adjacent symbol slots with subsymbols contained in the symbol slot presently pointed to by SY, and the subroutine returns via label 285. If the determination of block 283 is negative, the subroutine goes to block 284 and determines if any subsymbols in the symbol slot pointed to by SY can be merged with subsymbols in the symbol slot pointed to by CUR SYMB. If not, the subroutine returns via label 285, and if so, appropriately updates pointers in both symbol slots and returns via label 286.

Figure 5A:
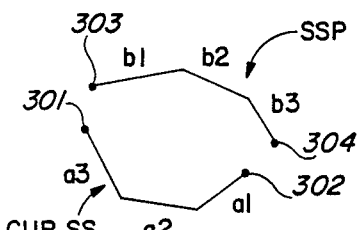
FIGS. 5A–5D are diagrams that are useful in describing merging of subsymbol slots in accordance with FIG. 5.

Next, the subroutine of FIG. 5 will be described, which shows how subsymbols contained in a symbol slot are merged if they are sufficiently close and are both "open" (note that closed subsymbols in a symbol slot cannot be merged). The "merge subsymbol" subroutine of FIG. 5 goes to decision block 190. In decision block 190, the subroutine determines if there is a "present" subsymbol slot, which will be pointed to by SSP, located after the current subsymbol slot pointed to by CUR SS in the linked list of subsymbols of the current symbol slot. (There is no need to determine if there is a mergable subsymbol located before the present subsymbol slot because of the action taken in decision block 24A of FIG. 2.) The present subsymbol slot SSP will have a number of linked vectors or entities in it already. If the subsymbol in the current subsymbol slot CUR SS does not merge with the present subsymbol slot SSP, the subroutine checks with each other subsymbol in the remainder of the linked list until it finds a present subsymbol with which the current subsymbol can merge. (Note that the current subsymbol slot might be mergable with any of the other subsequent subsymbol slots because there is no relationship between the linking of subsymbol slots and their physical location on the original drawing.) If no "present" subsymbol slot in the present symbol slot can merge with the current subsymbol slot, the subroutine returns via label 191. More specifically, if the determination of block 190 is negative, the subroutine returns via label 191. If the determination of block 190 is affirmative, the subroutine goes to block 192 and sets the SSP to include the first subsymbol slot after the current subsymbol slot CUR SS. The subroutine then goes to block 193 and determines if the end of the current subsymbol slot CUR SS is sufficiently close to the beginning of the present subsymbol. What this means can perhaps be best understood by referring to FIG. 5A, in which SSP represents the present subsymbol slot and CUR SS represents the current subsymbol slot. The end of the current subsymbol slot, which includes vectors a1, a2, and a3 sequentially linked together, is designated by point 301, and its beginning is designated by point 302. The beginning of the present subsymbol is point 303. The end of the present subsymbol, which includes vectors b1, b2, and b3 is point 304. Decision block 193 determines if the end point 301 is close to the beginning point 303.

If this determination is affirmative, the subroutine goes to block 196 and merges the end point 301 and the beginning point 303 together, deletes SSP from the linked list, and returns via label 197. If the determination of block 193 is negative, then the subroutine goes to decision block 194 and determines if the end of the current subsymbol CUR SS is close to the end of the present subsymbol SSP, i.e., if point 301 is close to point 304 in FIG. 5B. If this determination is affirmative, the subroutine goes to block 195 and reverses the directions of the present subsymbol b1, b2, b3, and then goes to block 196 and merges the present subsymbol to the end 301 of the current subsymbol, and deletes the present subsymbol from the linked list and returns.

Figure 5C:
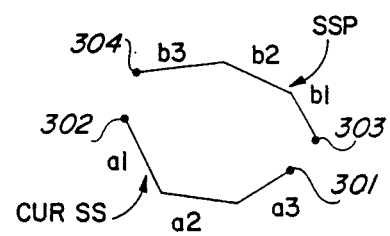
Figure 5B:
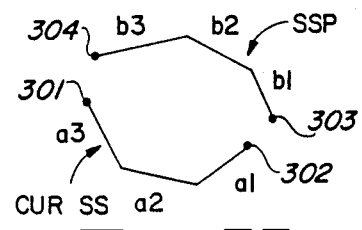
Figure 5D:
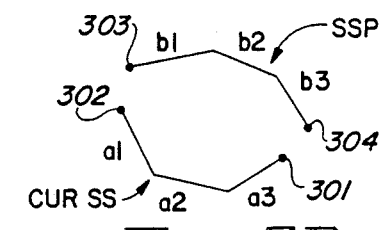

If the determination of decision block 194 is negative, then the subroutine goes to decision block 198, and determines if the beginning of the current subsymbol, namely point 302 in FIG. 5C is close to the end of the present subsymbol, namely point 304 in FIG. 5C. If this determination is negative, the subroutine goes to decision block 199 and determines if the beginning of the current subsymbol, namely point 302, is close to the beginning of the present subsymbol, namely point 303, in FIG. 5D. If this determination is affirmative, the subroutine goes to block 200 and reverses the direction of the current subsymbol a1, a2, a3, and goes to block 201 and merges the current subsymbol to the end of the present subsymbol, deletes the current subsymbol slot from the linked list, and sets the current subsymbol to point of the beginning of the present subsymbol slot. If the determination of block 198 is affirmative, the subroutine goes to block 201, described above.

If the determination of block 199 is negative, the subroutine goes to block 203 and sets the present subsymbol slot to the next subsymbol slot in the linked list (to ensure that all subsymbols of the linked list are considered), and goes to decision block 203A. In block 203A the subroutine determines if SSP is a null slot, and if it is, returns via label 191, and otherwise goes to block 193.

Figure 3:
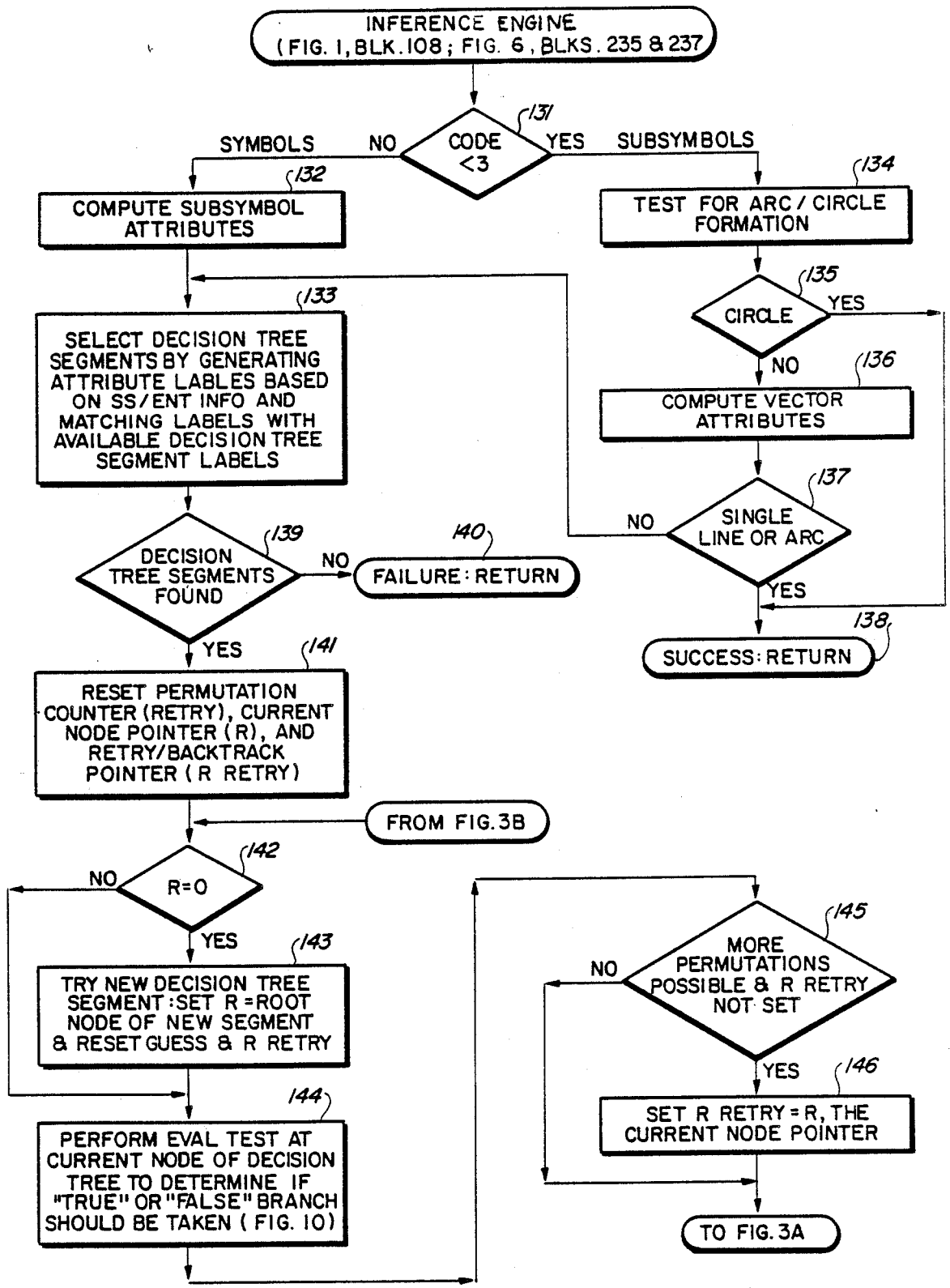
FIG. 3 is a flow chart of an inference engine subroutine corresponding to block 108 of FIG. 1.
Figure 3A:
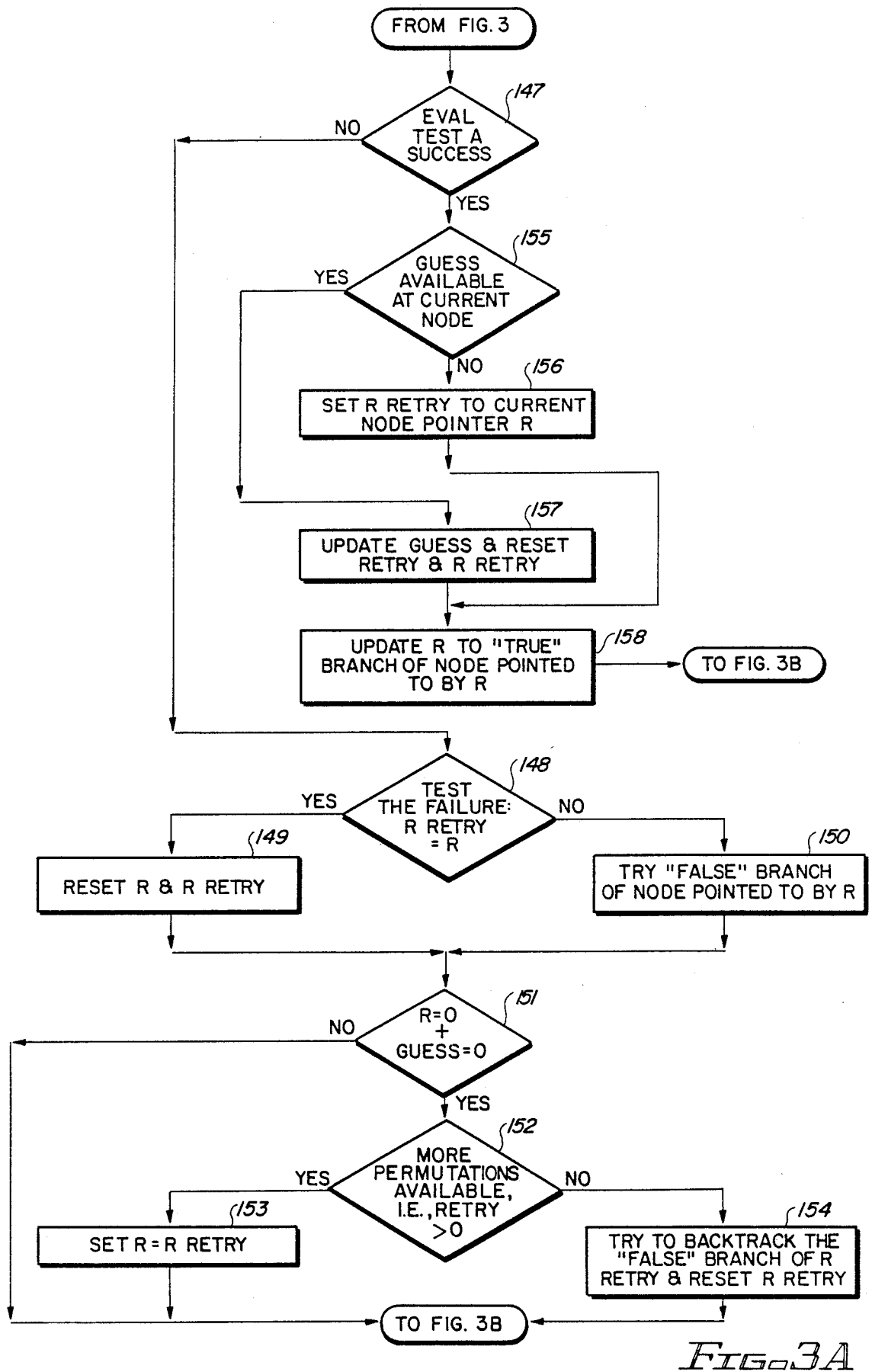
FIG. 3A is a continuation of the flow chart of FIG. 3.
Figure 3B:
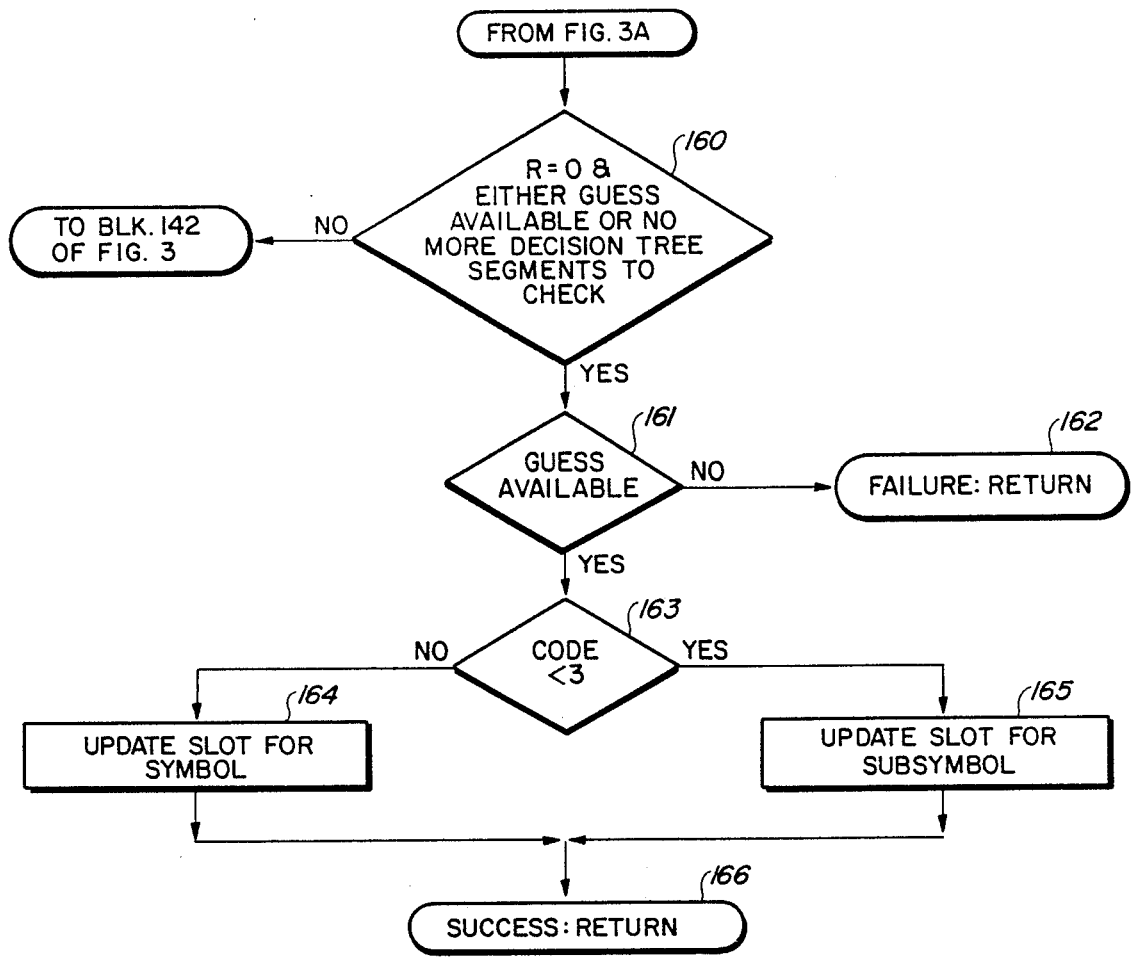
FIG. 3B is a continuation of the flow chart of FIG. 3A.

Perhaps the invention will be most easily understood if the subroutine called in block 108 of FIG. 1, and blocks 235 and 237 of FIG. 7 in which subsymbols or symbols are recognized, is described next. Referring to FIGS. 3, 3A, and 3B, an "inference engine" subroutine is called to control the manner in which decision trees compiled from the user-defined rule bases are applied to the linked lists of subsymbols contained in the symbol slots by matching decision tree segment labels to attribute labels computed from the available subsymbol or vector data.

The inference engine subroutine first goes to decision block 131 and tests a code that indicates from which point of the program the inference engine routine of FIG. 3 is called. More specifically, a variable CODE is given the value 1, 2, or 3 if the present subsymbol or symbol to be recognized is a closed subsymbol, an open subsymbol, or a symbol. A symbol is comprised of a plurality of smaller subsymbols.

If the determination of the inference engine subroutine 1 in block 131 is affirmative, it means that the data of the blackboard to be tested is a subsymbol (closed or open), rather than a symbol. This means that the inference engine subroutine was called from FIG. 7, block 235 or FIG. 1, block 108. The subroutine then goes to block 134 and tests the vectors in the current subsymbol to determine if it can be represented by arcs or a circle. (This is done by testing the geometrical relationships and relative sizes of the vectors, merging them if possible, and testing the results to see if an arc or a circle is being formed.) The subroutine then goes to decision block 135 and determines whether or not the data represents a circle. If this determination is affirmative, the subsymbol recognition has been a "success", and the subroutine returns to the calling subroutine, as indicated in label 138.

If the determination of block 135 is negative, the subroutine goes to block 136 and computes attributes such as length, orientation, centers of arcs for the vector or vectors of which the subsymbol is composed. The subroutine then goes to decision block 137 and determines if the subsymbol constitutes a single line or arc. If this determination is affirmative, it means that the subsymbol has been recognized, and the subroutine returns via label 138. Otherwise, the subroutine goes to block 133.

If the determination of block 131 is that the code is equal to 3, it means that there is more than one subsymbol and it needs to be determined whether the subsymbols can be combined to form a symbol.

The subroutine goes to block 132 and computes the attributes of the subsymbols. The subroutine then goes to block 133. In block 133, the inference engine subroutine generates attribute labels based upon the computed subsymbol attributes and/or vector attributes, and then compares those labels to segment labels of a decision tree compiled in accordance with FIG. 4, subsequently described.

The subroutine then goes to decision block 139 and determines if any decision tree segments were found that match the attributes of the present symbol or subsymbol. If this determination is negative, the subroutine cannot recognize any symbol or subsymbol contained in the present blackboard, and returns via label 140.

If the determination of decision block 139 is affirmative, the subroutine goes to block 141 and resets a permutation counter variable RETRY, resets a current node pointer R which points to various nodes of the decision tree, and resets a retry/backtrack pointer R RETRY. Each node of the subtree consists of (1) a test condition, (2) a current guess of what the symbol or subsymbol is, (3) a false pointer that points to a "false" subtree, and (4) a true pointer that points to a "true" subtree. The variable R points to the current decision subtree node being considered. The RETRY variable is equal to the number of possible permutations which remain untried. The R RETRY pointer points to the node from which the possible permutations are tested by the test condition of that node.

Figure 12:
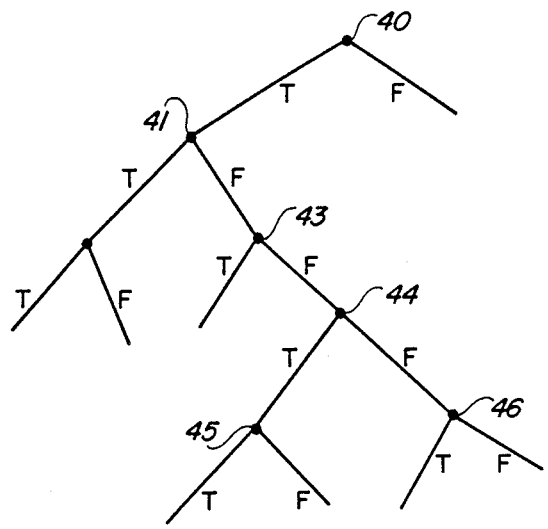
FIG. 12 is a diagram of a rule base decision tree and is useful in describing the operation of the invention.

When a backtrack operation is performed, the false branch rather than the true branch of the node pointed to by R RETRY is "traversed". In FIG. 12, a decision subtree is shown, in which reference numeral 40 designates the root node, and the letters T and F designate the true and false branches, respectively. Reference numeral 41 designates a root node of a Reference numeral 41 designates a root node of a subtree of the decision tree, and has its own true and false branches For example, if at node 44, it is found that there are a certain number of possible permutations of the subsymbols involved in the test condition associated with node 44 RETRY is set equal to that number of permutations, and R RETRY is set to point at that node. At long as the RETRY counter is not equal to zero, the "true" branches of the subtree are traversed. If by the time RETRY reaches zero a guess has not been achieved, then the process "backtracks" to node 44, and traverses down the false branch of node 44. It can be seen that the R RETRY pointer thus points both to the node at which the last true condition was met, and also points to the node at which a backtrack operation must be begun if no true condition is found by the time all of the permutations have been tried.

The subroutine goes from block 141 to decision block 142 and determines if the current node pointer R is zero, which indicates that no prior attempt has been made to recognize the present symbol slot or subsymbol slot by going through the decision tree, or that the last decision subtree traversed did not produce a guess. If this determination is negative, the subroutine goes to block 144. If the determination of block 142 is affirmative, this means that a new decision tree segment is to be attempted. The subroutine sets the current node pointer R to point at the "root node" of a new decision subtree. The subroutine also resets a variable GUESS and the retry/backtrack pointer R RETRY.

Next, in block 144, the subroutine performs a function referred to herein as the "EVAL function", which tests various permutations of linked lists of subsymbols and/or vectors with the decision tree segments found in block 133 and indicates which of two branches, a "true" branch and "false" branch, should be taken from the current node of the decision subtree. The manner in which the permutation structures are formed is described in further detail with reference to FIG. 10.

The inference engine subroutine goes from block 144 to decision block 145 and determines if the condition is met wherein any more permutations of subsymbols at the current node are pointed to by R and the retry/backtrack pointer R RETRY is still not set.

It should be understood that the user provides "rule bases" which are compiled into decision trees to achieve faster execution, wherein each subtree of a decision tree corresponds to a particular type of symbol or subsymbol. Certain nodes of the decision tree have "guesses" associated with them, so that even if a positive recognition cannot be made, a reasonable guess, identified by a string of characters that indicate the best current guess as to what the symbol to be recognized is, i.e., a triangle, square, etc., can be made.

The subroutine then goes to block 146 and sets the R RETRY pointer to the value of R, the current node pointer, and goes to the beginning of FIG. 3A. If the determination of block 145 is negative, then it goes to the same point.

In FIG. 3A, the subroutine goes to decision block 147 and determines if the outcome of the EVAL test of block 144 is a "success", i.e., whether the result of the EVAL test was "true" (success) or "false" (failure). If the determination of block 147 is affirmative, the subroutine goes to block 155 and determines if at the current node of the decision subtree a "guess" is available. (It should be appreciated that a considerable number of tests may be necessary before a reasonable guess can be made as to what the symbol or subsymbol being tested at a particular subtree node is.)

If no guess is available at the current node of the decision tree, the subroutine goes to block 156 and sets the R RETRY pointer to R, so that the subroutine can later backtrack to the present node. The program then goes to block 158 and "updates" the current node pointer R to indicate or point to the "true" branch of the current node pointed to by RE RETRY.

The subroutine then goes to FIG. 3B. In FIG. 3B the subroutine goes to decision block 160 and determines if the condition exists wherein R is zero (i.e., R points to a "leaf" node or a "dead end" node) and either a guess is available or there are no more decision tree segments to check. If this decision is negative, it means that the subroutine has reached a dead end and that no guess has been obtained, and there are some decision subtree segments left to be checked. The program returns to block 142 of FIG. 3 to try a new segment of the decision tree.

If the determination of decision block 160 is affirmative, this means the subroutine goes to decision block 161 and determines if a "guess" is available at the present node of the decision tree. If this determination is negative, it means that the subroutine cannot recognize the present symbol or subsymbol, and returns to the calling routine via label 162. If the determination of decision block 161 is affirmative, the subroutine goes to decision block 163 and determines if the above mentioned code is less than 3, that is, whether the present data is a symbol or a subsymbol, and accordingly "updates" the symbol slot or the subsymbol slot as indicated in blocks 164 and 165 by setting a flag indicating the present symbol or subsymbol has been recognized and inserting a name for the recognized symbol or subsymbol. The subroutine then indicates success in label 166 and returns.

If the determination of decision block 147 (FIG. 3A) is negative, i.e., the present subsymbol is not matched to the "true" branch of the EVAL function, the subroutine goes to block 148 in FIG. 3A to "test the failure" and determines if the retry/backtrack pointer R RETRY points to the present node of the present decision subtree. If the determination of block 148 is affirmative, the subroutine goes to block 149 and resets both the current node pointer R to zero and also sets the retry/backtrack pointer R RETRY to zero. Otherwise, the subroutine goes to block 150 and tries the "false" branch of the current node pointed to by R.

In either case, the subroutine then goes to block 151 and determines if the condition is met wherein both R is equal to zero and the variable GUESS is equal to zero, meaning there is no guess yet available at the current node of the decision subtree. If this determination is negative, it means that the current node of the decision subtree is a dead end, and the subroutine goes to FIG. 3B, already described.

If the determination of block 151 is affirmative, the subroutine goes to block 152 and determines if any more permutations of the permutation structure are available at the current node of the decision tree. If this determination is affirmative, the subroutine goes to block 153 and sets the RETRY pointer equal to R, so that another permutation of the PERM structure can be tested. If the determination of block 152 is negative, the subroutine goes to block 154 and attempts to backtrack through the "false" branch of the node pointed to by RE RETRY and then resets R RETRY.

Figure 10:
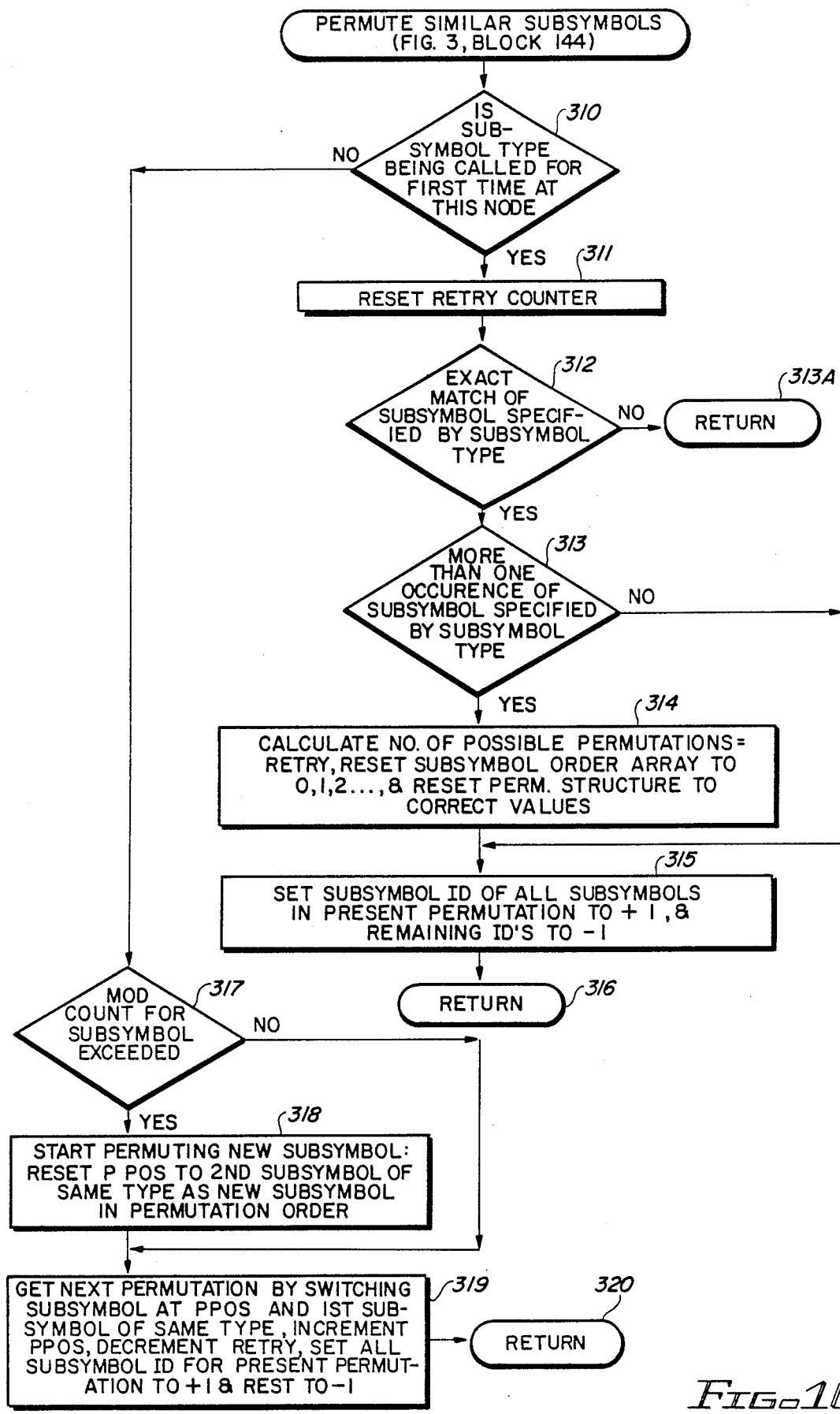
FIG. 10 is a flow chart of a subroutine corresponding to block 144 of FIG. 3.

Next it will be convenient to describe the "permute similar subsymbols" subroutine of FIG. 10, which is called by block 144 of FIG. 3 if decision tree segments are found matching the computed subsymbol attributes, in order to test every possible permutation of the subsymbols of the linked lists in the present symbol slot and test each such permutation against the appropriate decision subtree node test to determine if any of the permutations form a recognizable symbol. To accomplish this it is necessary to keep track of which permutations have been tested. An identification number ID having a value of +1 is assigned to each subsymbol that is still included in the present permutation structure, and an I.D. value of −1 is assigned to each subsymbol that is not presently included in the permutation structure.

Each of the subsymbols is assigned an ID number of −1 initially. Each subsymbol is assigned an I.D. number of +1 if it is included in a permutation structure. At each subtree node the EVAL function is called (FIG. 3, block 144) to perform various tests on the subsymbols. For example one test can be to look for a particular order of subsymbols If that test determines that there can be more than one combination of the present group of subsymbols, this means it will be necessary to form a permutation structure and test each of the possible permutations of it. As each is permuted, it is assigned an ID number of +1.

At a particular node of a subtree of the decision tree, user will have specified in the rule base from which the decision tree is compiled a certain number of subsymbols in the order in which they should occur in order to constitute the symbol recognized by that decision subtree. Each of those subsymbols will have associated with it a particular "subsymbol type", each of which is represented by a different value of the variable SS TYPE. For example, SS TYPE may represent a triangle, circle, square, etc.

Referring to FIG. 10, the subroutine first goes to decision block 310 and determines if the subsymbol type SS TYPE is presently being called for the first time at the present node of the decision subtree. If it is the first time, the subroutine goes to block 311 and resets the permutation counter RETRY. The subroutine then goes to decision block 312 and it determines if there is an exact match of the subsymbol types specified by the test condition at that node. If this matching fails the subroutine returns via label 313A.

If the determination of block 312 is affirmative, the subroutine goes to block 313 and determines if there is more than one occurrence of the subsymbol type specified by SS TYPE in the present permutation of the linked subsymbol list in the present symbol slot. If this determination is negative there are no additional permutations and the subroutine goes to block 315 and sets the subsymbol ID of all subsymbols in the present permutation to +1 and the remaining subsymbol IDs of the linked list to −1. The subroutine then returns via label 316. If the determination of decision block 313 is affirmative, the subroutine goes to block 314 and computes the number of possible permutations and sets the permutation counter RETRY equal to that number, resets a subsymbol order array to an initial sequential, consecutive order and resets the PERM structure to correct values. The subsymbol order array indicates the order of the entire subsymbol linked list The subroutine then goes to block 315, previously described.

If the determination of block 310 is negative the subroutine goes to decision block 317 and checks a "modulo count" which is one of the elements in the PERM structure for this particular node, has been exceeded. (The modulo count is simply the number of permutations for a particular subsymbol type. The term modulo as used herein has the same meaning as it does in any standard mathematical text dealing with permutations.) If this determination is negative, the subroutine goes to block 319. If the determination of block 317 is affirmative, the subroutine goes to block 318 and starts permuting the "new subsymbol". It accomplishes this by resetting the variable P POS value to correspond to the new subsymbol's value in the PERM structure P POS represents the position in the PERM structure of the next occurrence of the subsymbol of the same subsymbol type that is presently being permuted.

The subroutine then goes to block 319 and obtains the next permutation of the present PERM structure by switching the subsymbol at the P POS location and the first subsymbol the same type, increments P POS, decrements the permutation counter RETRY, and sets all subsymbol ID numbers for the present permutation to +1 and the remainder to −1.

This permutation technique has the advantage of avoiding the need to store each permutation, which could require a great deal of memory space, and also allows a new permutation to be obtained by merely switching two subsymbols.

Figure 4:
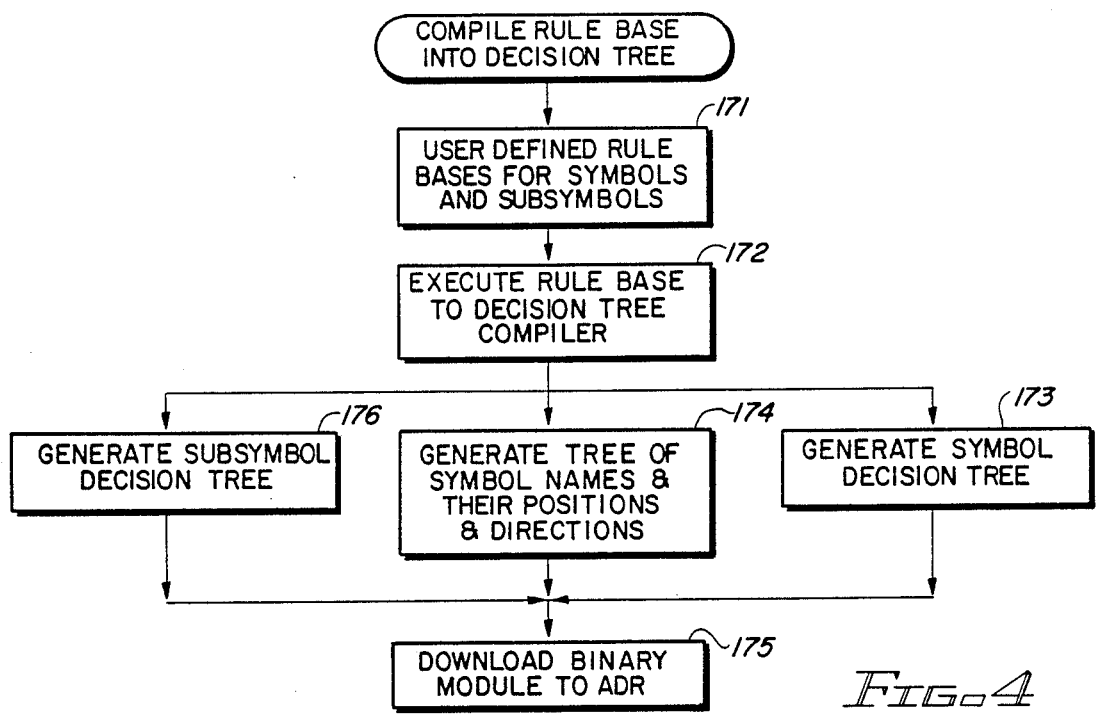
FIG. 4 is a general flow chart illustrating the conversion of a symbol rule base into a corresponding decision tree which is called by the inference engine of FIG. 3.

As previously mentioned, the user-supplied rule bases for recognizing subsymbols and symbols are converted into a decision tree in order to effectuate more rapid computation and recognition. At the present time rule bases have been developed only for symbols, open loop subsymbols and closed loop subsymbols, so three corresponding decision trees have been compiled. As indicated in FIG. 4, any user-defined rule base is provided as an input to the compiler, which then executes the rule base to compile it in order to generate a "symbol decision tree" of the type shown in FIG. 12, as indicated in block 173 or a subsymbol decision tree, as indicated in block 176. The compiler also produces a tree of symbol names and the positions and directions of each of the symbols or subsymbols that can be recognized by the rule base.

The symbol decision tree, subsymbol decision tree and tree of symbol names then are downloaded as a binary module to the automatic drawing recognition (ADR) system so that the decision trees can be used in accordance with FIG. 3, described above.

Compiling the user defined rule bases to decision trees is a fairly straightforward procedure that can be easily implemented by those skilled in the art, and therefore is not described in detail here.

Next, the subroutine of FIG. 6 which is called by block 109 of FIG. 1, will be described. This routine is called by FIG. 1 after all vectors and entities in the vector table VECGEN have been fetched and run through the earlier part of the symbol recognition program of FIG. 1.

It should be noted that various parameters used in determining whether to merge subsymbols, such as spacings, sizes of subsymbols, etc. are associated with each blackboard. When parameters for that blackboard are reset certain pointers pointing to such tolerances are reset The subroutine of FIG. 6 first goes to block 210 and sets the current symbol slot pointer CUR SYMB to point to the leftmost symbol in the upper level of the current blackboard, and resets the above blackboard parameters in accordance with the subroutine of FIG. 6A, and resets certain system pointers to a "job queue". In the described embodiment of the invention, the ADR system has multi-processing capability so it is necessary to provide a job queue and reset certain system pointers to it as will be understood by those skilled in the art. Processing of each symbol slot is considered to be a "job". Referring briefly to FIG. 6A, in order to reset the blackboard parameters, the subroutine goes to decision block 219 and determines if the current blackboard is "active", meaning that the current blackboard is not a "null" blackboard which does not correspond to a window in which symbol recognition is desired. explain.) If this determination is negative, the subroutine goes to block 221 and sets a variable BLKB to point to the blackboard corresponding to the present (new) window, and resets the parameters of the new blackboard. If the determination of block 219 is affirmative, the subroutine goes to block 220 and saves the current blackboard in a "active" list, and then goes to block 221. The subroutine then returns to block 210 of FIG. 6.

Next, the current blackboard processing subroutine goes to block 211 and submits the current symbol slot to the job queue so that the current symbol slot can be processed at the appropriate time.

The subroutine goes from block 211 to decision block 212 and determines if the current symbol slot is the rightmost symbol slot at the current level. In other words, is the current symbol the last symbol slot at the present level. If this determination is negative, the subroutine goes to block 213 and sets the current symbol slot equal to the adjacent right symbol slot, and returns to the decision block 211 This is repeated until there are no more symbol slots to the right of the current symbol slot. Then an affirmative determination will be obtained i from decision block 212, and the subroutine goes to block 214 and determines whether there is any symbol slot below the current level. If this determination is affirmative, the subroutine goes to block 215 and sets the current symbol slot pointer CUR SYMB to point to the next lower symbol slot and returns to block 211.

If the determination of block 214 is negative the subroutine goes to block 216 and determines if there are more symbol processing tasks in the job queue, and if not, returns via label 217. If there are more symbol slots to process, the subroutine goes to bock 218 of FIG. 7 to process the next job, and then returns to block 216.

The symbol processing jobs all are submitted from the present blackboard before any symbol slots from another blackboard are presented to the job queue. It should be noted that the symbol slot processing jobs loaded into the job queue need not all be from the same blackboard. That is, successive symbol slot processing jobs may come from various blackboards. This is why it is necessary to reset the current blackboard if the current blackboard does not point to the current window.

Figure 6:
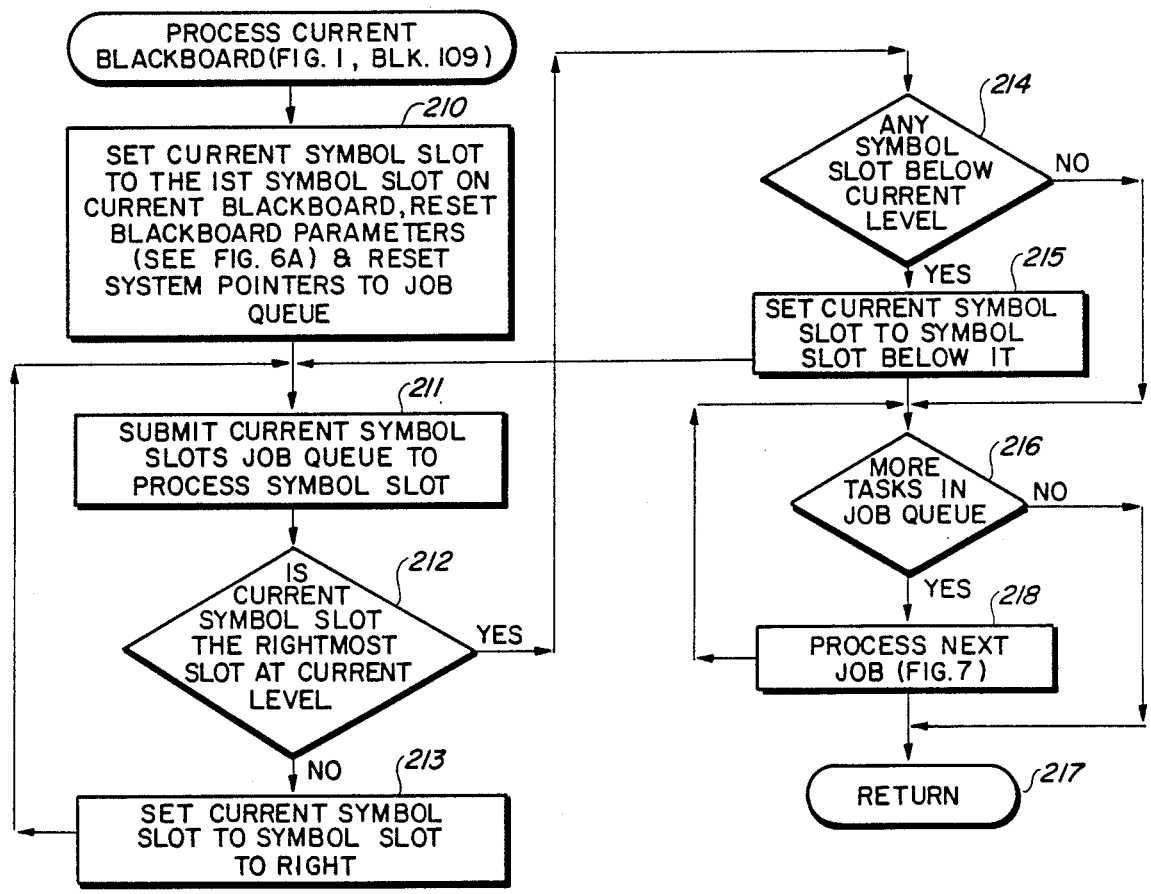
FIG. 6 is a flow chart of a subroutine corresponding to block 109 of FIG. 1.
Figure 7:
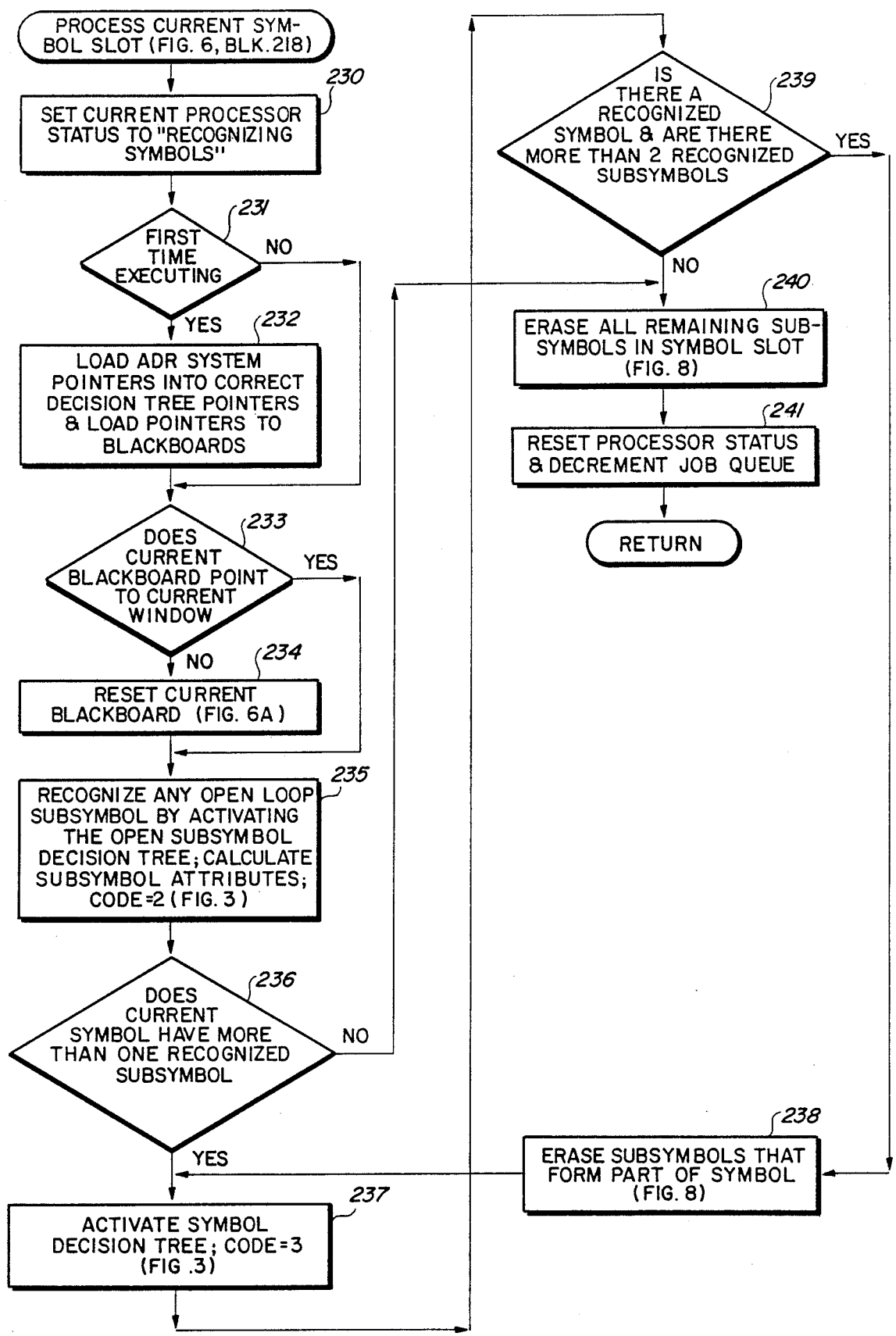
FIG. 7 is a flow chart of a subroutine corresponding to block 211 of FIG. 6.

Before describing the flow chart of FIG. 7, it should be noted that all processing of the symbol slot program prior to execution of the flow chart of FIG. 7 is done on a single processor in the ADR. However, the ADR has multi-processing ability, so it is necessary to submit individual symbol slots or jobs to the job queue as described above with reference to block 211 of FIG. 6. Once symbol slot processing jobs are in the job queue, then any of a number of processors can actually process the job, depending upon their availability. This makes it necessary that each of the multi-processors have a copy of the symbol recognition program. Therefore, certain steps in the flow chart of FIG. 7 pertain to establishing processor status and setting and resetting processor status, decrementing the job queue, and resetting the current blackboard.

Referring now to FIG. 7, the "process current symbol slot" subroutine first goes to block 230 and sets the current status of the present processor to indicate that it is performing symbol recognition to enable the workstation to monitor the status. The subroutine then goes to decision block 231 and checks to determine if the present processor is performing symbol recognition for the first time, so the subroutine knows whether or not it is necessary to update the decision tree pointers, etc.

If the determination of block 231 is negative, the subroutine goes to decision block 233. If the determination of block 231 is affirmative, then the subroutine goes to block 232 to update a number of variables from the ADR system pointers into the correct decision tree pointers, a list of active blackboards and their associated parameters.

All that information is then loaded into the particular processor running the symbol recognition program to process the current symbol slot.

In decision block 233, the subroutine determines if the current blackboard variable BLKB points to the current window in which the present symbol slot being processed is located. If this determination is affirmative the subroutine goes to block 235, but otherwise goes to block 234 and executes the subroutine of FIG. 6A to reset the current blackboard.

Next, the subroutine goes to block 235, and recognizes any open loop subsymbol in the present symbol slot by activating the open subsymbol decision tree. This includes assigning to the variable CODE a value of 2 and executing the inference engine subroutine of FIGS. 3, 3A, and 3B, previously described The subroutine then goes to decision block 236 to determine if the current symbol slot has more than one recognized subsymbol. This determination is made so that it can be determined if there are any combinations of recognized subsymbols that form a symbol. If the determination of block 236 is negative, the subroutine goes to block 240, and erases all remaining subsymbols in the symbol slot pointed to by CUR SYMB by calling the erase subroutine of FIG. 8 The subroutine then goes to block 241, resets the processor status flags, decrements the job queue, and then returns.

If the determination of decision block 236 is affirmative, the subroutine assigns a value of 3 to the variable CODE and calls the inference engine subroutine of FIG. 3 to attempt to recognize a symbol composed of the recognized subsymbols.

The subroutine then goes to decision block 239 and determines if any symbol was thereby recognized and if there are any additional recognized subsymbols that were not combined into the recognized symbol. If this determination is negative, the subroutine goes to block 240 and erases those remaining subsymbols. However, if the determination of block 239 is affirmative, the subroutine goes to block 238 and calls the subroutine of FIG. 8 to erase only those subsymbols that are part of the recognized symbol, and returns to the inference engine to attempt to recognize a symbol comprised of the remaining recognized symbols.

It should be appreciated that the linked list of subsymbols gets rearranged by the permutation algorithm of FIG. 10, already described. (This is executed in performing the EVAL test of block 144 of FIG. 3.) In the rearrangement of the linked list of subsymbols, the subsymbols that form a part of the recognized symbol appear at the beginning of the linked list and the subsymbols that are not used in the recognition of the particular symbol are arranged at the end of the new linked list. Only those at the beginning of the linked list, used in recognition of a symbol, are erased in block 238, and the rest are returned to the symbol decision tree activated in block 237.

Figure 8:
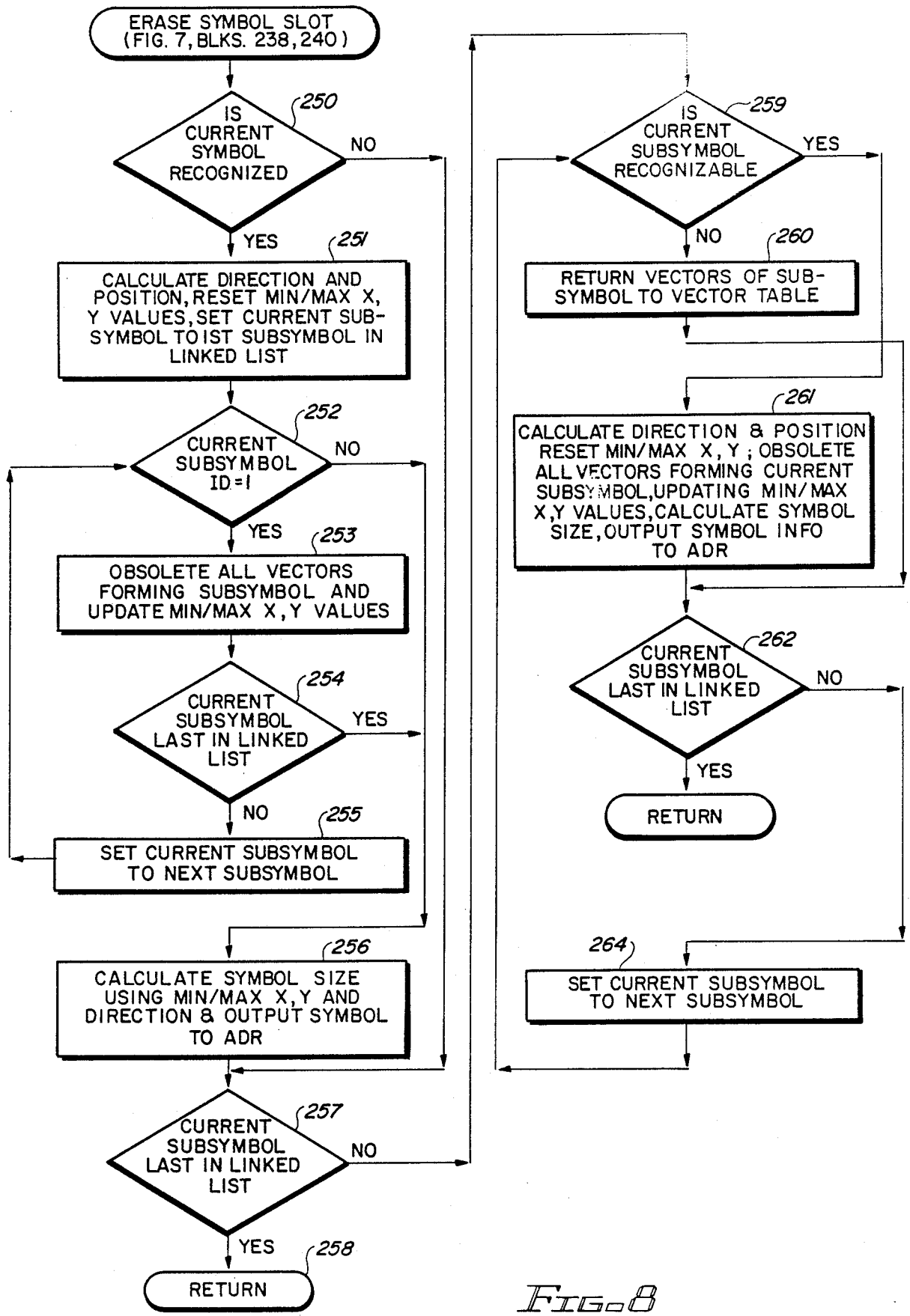
FIG. 8 is a flow chart of a subroutine corresponding to blocks 138 and 140 of FIG. 7.

Before explaining the "erase" symbol slot subroutine of FIG. 8, it should be noted that when a symbol has been recognized, all of the subsymbols that form a part of the recognized symbol appear at the beginning of the linked list containing those subsymbols and have an I.D. flag of +1, as a result of the action of the permutation subroutine of FIG. 10. When the linked list of subsymbols is recursively passed through the symbol rule base, in accordance with blocks 237 and 238 and 239 of FIG. 7, it is necessary to first erase the subsymbols at the beginning of the linked list forming part of the recognized subsymbol.

This is what the subroutine of FIG. 8 can do. It first goes to decision block 250 and determines if the current symbol is recognized. If it is, the subroutine goes to block 251 and calculates the direction and position the recognized symbol, resets the minimum and maximum values of X and Y, and sets the current subsymbol pointer CUR SYMB to the first subsymbol in the linked list. If the determination of block 250 is negative, the subroutine goes to decision block 257.

After completing block 251, the subroutine goes to decision block 252 and determines if the current subsymbol has an I.D. number equal to +1. If it has a value of +1, it means that the current subsymbol is part of the recognized symbol. If the determination of block 252 is negative, the subroutine goes to block 256, but otherwise goes to block 253 and "obsoletes" or "erases" all vectors or entities forming the current subsymbol and updates the minimum and maximum X and Y values. (The minimum X and Y values and maximum X and Y values for each vector or entity that are a part of the symbol or subsymbol being erased are kept in order to allow the "scale" of the recognized symbol to be calculated, using the direction of the symbol.) The subroutine then goes to decision block 254 and determines if the current subsymbol is the last subsymbol in the linked list. If this determination is affirmative, the subroutine goes to block 256, and otherwise goes to block 255 and increments the current subsymbol to the next subsymbol in the linked list.

In block 256, which is entered if the current subsymbol is not part of the recognized symbol or is the last subsymbol in the linked list, the subroutine calculates the size of the symbol (using the minimum and maximum X and Y values and the direction) and outputs the symbol data including a symbol identified number which corresponds to a symbol library accessible by the workstation, the X and Y position coordinates of the symbol, its direction, and its X direction and Y direction scales to a "SYMBOLS area" of the ADR. That information then is later used by the workstation to recreate the recognized symbol.

In block 257 the subroutine determines if the current subsymbol is the last in the linked list. If this determination is affirmative, the subroutine returns via label 258 but otherwise goes to decision block 259 and determines if the current subsymbol is a recognizable symbol. (Note that the recognized symbol has been removed.) If this determination is affirmative, the subroutine goes to block 261, but otherwise goes to block 260 and returns the vectors or entities of the current subsymbol unchanged to the vector table. The subroutine goes from block 260 to decision block 262

If the subroutine enters block 261 because the current subsymbol is recognizable, the subroutine computes the direction and position of the current subsymbol, resets the minimum and maximum X and Y variables, erases all vectors or entities forming the current subsymbol, updates minimum and maximum X and Y values for each vector, computes the size of the recognized symbol, and outputs the parameters of the recognized symbol to the SYMBOLS i area of the ADR. The program then goes to decision block 262 and determines if the current subsymbol is the last one in the linked list, and if it is, returns, but otherwise goes to block 264 and sets the current subsymbol pointer CUR SYMB to the next subsymbol in the linked list, and returns to decision block 259.

The microfiche appendix submitted herewith contains code executable by a Motorola 68020 microprocessor and represented by the above-described flow charts.

The operation of the symbol recognition technique of the present invention can be further understood by explaining a simple example FIG. 13 shows steps (a) through (h) in which a number of simple vectors are fetched from a vector table to build and recognize a pair of symbols. In step (a) of FIG. 13, vector 50 is first fetched from a portion of the vector table defined by a window, in accordance with block 100 of FIG. 1. The program determines that it is not the end of the vector file, that vector 50 is not too large to be part of the symbol, selects the proper blackboard, and inserts vector 50 into the correct subsymbol slot and symbol slot of the selected blackboard. More specifically, in selecting the correct symbol slot, the program goes to FIG. 2. The first time through CUR SYMB will be zero, so the program initializes the blackboard and creates the first symbol slot, which is designated by dotted lines 62 in FIG. 13, and then goes to block 124A, determines that it is necessary to create a new subsymbol slot, creates subsymbol slot 58 in block 124C, and puts vector 50 into it. Step (a) of FIG. 13 thus shows vector 50 in subsymbol slot 58, and thus in symbol slot 62. No possible merge is detected in block 105 or 106, nor is a loop detected in block 107 of FIG. 1, so the program returns to block 100 and fetches vector 51, and passes through blocks 101, 102, 103, and 104 of FIG. 1 The procedure is the same as for vector 51, except that in block 124A of FIG. 2, an affirmative decision is made, so vector 51 is inserted into already-existing subsymbol slot 58, as indicated in block 124B and then in block 122.

In step (c) of FIG. 13, dotted line 64 is intended to represent a large vector that could be fetched next from the vector table. Such a vector would be eliminated by decision block 102 of FIG. 1, and returned unchanged to the vector table. Then another vector 52 is fetched from the vector table, and the previously-described procedure for inserting it into the vector table is carried out, whereby vector 52 is inserted into subsymbol slot 58.

Then, as indicated in step (d) of FIG. 13, vector 53 is fetched from the vector table. This vector 53, when inserted into subsymbol slot 58, forms a closed loop. Although not shown in FIG. 2 (but shown in the printout of corresponding code in Appendix A, attached hereto), the symbol recognition program is written so that when closed loop subsymbols are formed, additional subsymbol slots are created for vectors connected to such closed loop subsymbols. Accordingly, subsymbol slot 59 is created for vector 52 because vector 53 forms a closed loop. This determination is made, and subsymbol slot 59 is created in accordance with block 201 of FIG. 5. Decision block 107 of FIG. 1 then produces an affirmative determination, causing the inference engine subroutine of FIG. 3 to be activated for the condition CODE equals 1. Vector attributes are computed in block 136, and corresponding decision tree attribute labels are computed in block 133, and an affirmative decision is obtained in block 139, and the EVAL function is performed in accordance with block 144 and recognizes the subsymbol including vectors 50, 51, and 53 as a triangle, and affirmative determinations are obtained in blocks 147 and 155 in FIG. 3. The GUESS variable is updated in block 157, affirmative decisions are obtained in blocks 160 and 161 of FIG. 3A, and the subsymbol slot is updated with an indicator representative of the recognized triangle. Next, as indicated in step (e) of FIG. 13, vector 54 is fetched from the vector table. When block 124A of FIG. 2 is reached, a negative determination occurs. Therefore, the subroutine goes to block 124C and creates a new subsymbol slot 60 and inserts vector 54 into it, as indicated in block 122. Thus, at this stage of filling the blackboard, symbol slot 62 contains the shape indicated in step (e) of FIG. 13.

Next, vector 55 is fetched from the vector table. In decision block 125 of FIG. 2, an affirmative decision is obtained, because vector 55 is located below symbol slot 62. Since there is no symbol slot below symbol slot 62, the subroutine goes from decision block 125 to block 124 and creates symbol slot 63. (For simplification, the flow chart of FIG. 2 does not show this path, although the program listing of Appendix A includes it.) The subroutine of FIG. 2 then goes to decision block 124A, which produces a negative determination, so then goes to block 124C and creates subsymbol slot 61, and in block 122 puts vector 55 into subsymbol slot 61.

Next, the program fetches vector 56 from the vector table and inserts it in subsymbol slot 61, along with vector 55, in symbol slot 63. In this case, vector 56 in symbol slot 63 is close to vector 54 in symbol slot 62, bringing the subroutine of FIG. 9 into play. At this point a subsymbol slot pointer CUR SS points to subsymbol slot 61 and CUR SYMB points to symbol slot 63 In block 270 of FIG. 9, since the symbol pointer SY points to the leftmost symbol slot above symbol slot 63, SY is set to point to symbol slot 62. The subroutine of FIG. 9 then goes to block 272. Since slot 62 is not a null slot, the subroutine goes to block 273 and determines that subsymbol slot 60 which contains vector 54, is close enough to be merged with subsymbols in the current symbol slot 63, i.e., with vectors 56 and 55. The subroutine of FIG. 9 goes to block 274 and updates symbol slots 62 and 63 by "pulling" vector 54 into symbol slot 63, as indicated in step (g) of FIG. 13.

Figure 5:
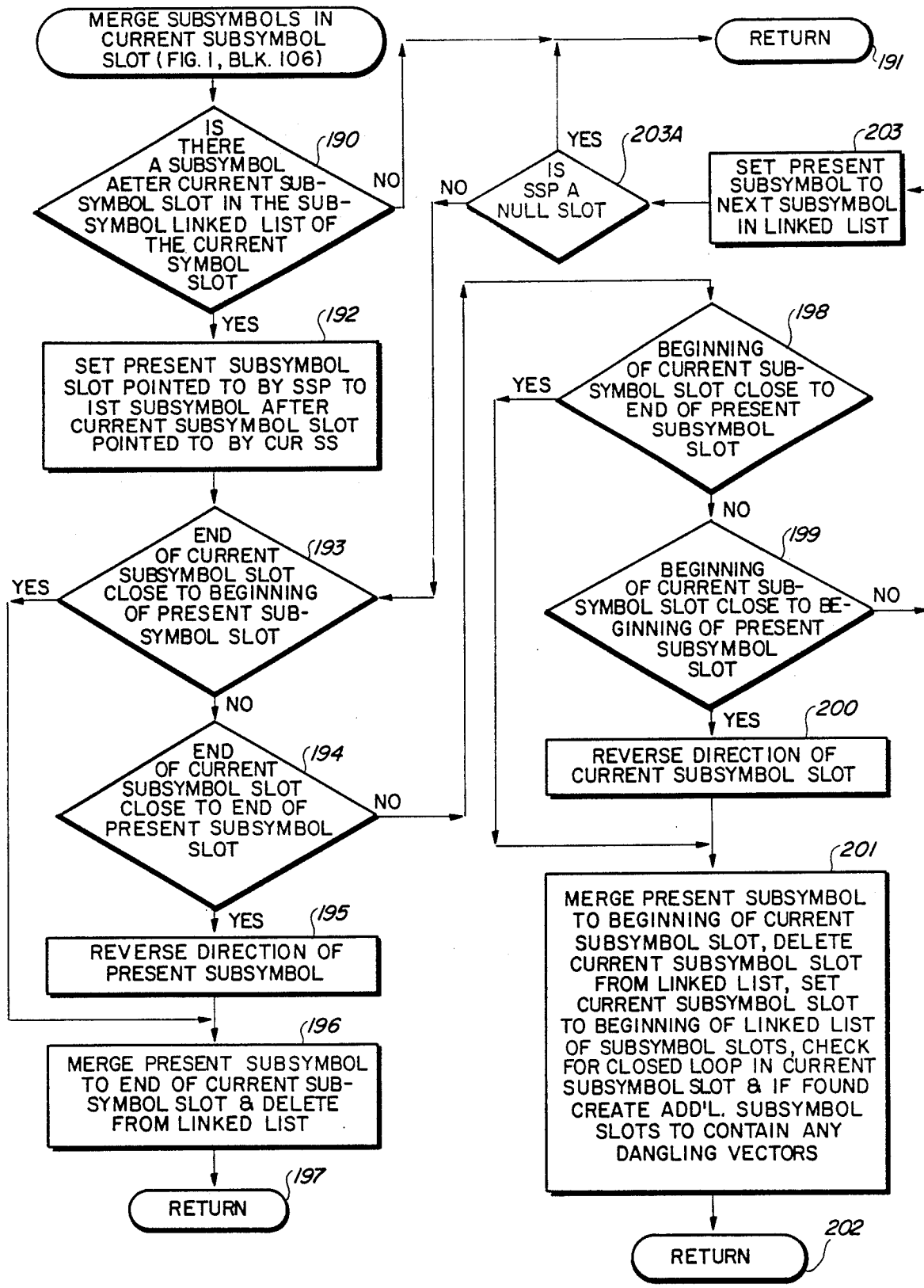
FIG. 5 is a flow chart of a subsymbol merging subroutine corresponding to block 106 of FIG. 1.

Note that the merging of vectors 55 and 56 with vector 54 does not occur in the subroutine of FIG. 9, but in the subroutine of FIG. 5, which is called by block 106 of FIG. 1.

Next, the program fetches vector 57 and inserts it into subsymbol slot 61, as indicated in step (h) of FIG. 13. Since this forms a closed loop, in block 107 of FIG. 1, the symbol rule base is activated. When the rule base is activated, CODE is equal to 1, so in FIG. 3, the program goes through blocks 132 and 133, finds decision tree segments corresponding to a rectangle but since none of the four vectors 54, 55, 56, or 57 occur more than once, there is no permutation structure. The EVAL test results in recognition of a rectangle, the variable GUESS is updated to indicate a rectangle, and the program passes through blocks 157 and 158 of FIG. 3A and through blocks 160 and 161 and 163 of FIG. 3B and 164 of FIG. 3B, and goes to block 109 of FIG. 1, which calls the subroutine of FIG. 6. The subroutine of FIG. 6 submits the symbols in symbol slots 62 and 63, namely the triangle and the rectangle, to the job queue. The program passes through the subroutine of FIG. 7, and erases the recognized subsymbols, namely the triangle and the rectangle from the blackboard in accordance with FIG. 8, which, at block 259, recognizes the current symbol as recognizable, goes to block 261, computes the various parameters of the triangle or rectangle and outputs the symbol information to the ADR (automatic drawing recognition system). The recognized vectors of the recognized triangle and rectangle are erased and vector 52 is returned to the vector table.

Next, the filling of the blackboard will be described for another example to illustrate the operation of the permutation subroutine of FIG. 10. In FIG. 14, steps (a) through (h) illustrate the step-by-step insertion of a number of vectors forming subsymbols 70A, 70B, 70C, 73, 71, 76, and 72 in that order is illustrated. In this case, subsymbols 71 and 72 from the vector table are identical, giving rise to two possible permutations that need to be tested in the rule base decision tree by appropriate EVAL functions in order to recognize the subsymbol, which turns out to be an inverter, as shown in step (h), after it is recognized that subsymbol 72, rather than subsymbol 71 is the one which, when included with the triangle combines to form a recognizable symbol, whereas the linked list permutation including circle 71 is not recognizable. Step (e) shows the subsymbol slots and symbol slots 74 and 75 that have been created and filled with fetched vectors just prior to the time at which circle 72 has been fetched from the vector table and inserted into symbol slot 74.

Figure 6A:
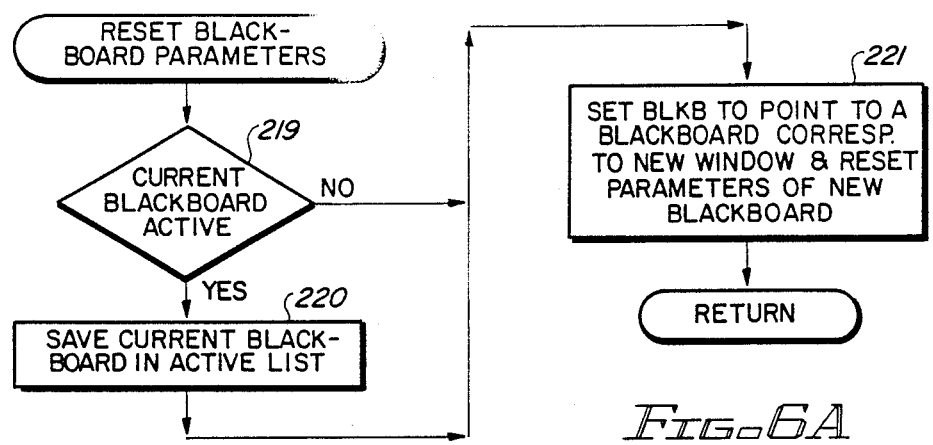
FIG. 6A is a flow chart of a subroutine corresponding to block 210 of FIG. 6.

After vector 70C is fetched (step (g) and inserted into the appropriate symbol slot 74, and the symbol 70 has been recognized as a triangle and the blackboard has been filled, and the inference engine of FIGS. 3, 3A, and 3B is activated as a result of the subroutine of FIG. 6 being called. Symbol slot 74 is then submitted to the job queue, and the subroutine of FIG. 7 is then called, resulting in an affirmative decision in block 236. The inference engine subroutine then is activated with CODE=3 in block 237.

This causes the subsymbol attributes of triangle 70A-C and circles 71 and 72 to be computed in block 132 of FIG. 3. Matching rule base decision tree segments are found in accordance with block 133. There will be a set of sequential geometric tests contained in the EVAL functions at various nodes of the resulting rule base decision tree to recognize a triangle with a circle touching one apex. The determination of block 139 in FIG. 3 will be affirmative, so the permutation counter, current node pointer, and retry/backtrack pointers will be reset in block 144.

The EVAL test will be performed at the current node of the rule base decision tree in accordance with block 144 to test for the presence of one triangle and one circle. Two circles, namely circles 71 and 72, and one triangle, namely triangle 70A-C. will be found. Therefore, the retry pointer RETRY is set to 2 because there are two possible permutations of one triangle and two circles. In block 146 of FIG. 3B, R RETRY is set to R. The first permutation attempted in block 144 will be between circle 71 and triangle 70A-C, which obviously will lead to a failure in decision block 147 of FIG. 3 because circle 71 and triangle 70A-C do not form an inverter symbol. The program will then go to block 148 in FIG. 3A, produces an affirmative decision in block 151, determines that another permutation is available in block 152, goes to block 153, and then goes to block 160 in FIG. 3B and produces a negative decision, and therefore goes back to block 142 in FIG. 3. Then the program performs the EVAL test on the permutation structure including triangle 70A-C and circle 72. Then, in block 147, a determination will be made that the EVAL test is a success, since triangle 70A-C and circle subsymbol 72 do form a recognized inverter symbol. A guess will be available as determined in block 155, since the inverter has been recognized, and the variable GUESS will be updated in block 157 The program then will produce an affirmative determination in block 160 of FIG. 3B and also in block 161, and then will go to block 164, since the inference engine was called with CODE equal to 3, and updates symbol slot 74 by inserting the correct guess identifier, which will include a code number that represents an inverter In accordance with a negative decision in block 239 of FIG. 7, goes to block 240 of FIG. 7, and erases triangle 70A-C, circle 72 from symbol slot 74, and in accordance with block 253 of FIG. 8, and returns unrecognized subsymbols 73, 76 and 71 to the vector table in accordance with block 260 of FIG. 8, the correct symbol size, direction, and other parameters are determined and output to the symbols area of the ADR system.

The above-described invention provides a very effective technique for operating upon vectors or entities in a particular location of a drawing by limiting much of the computer processing to vectors or entities located in isolated symbol slots, in contrast to prior techniques that require sorting operations involving every entity from a vector table or the like. This results in very rapid symbol recognition. The technique of inserting vectors in symbol slots even avoids the need to process all vectors or entities in that symbol slot by determining in a few operations which symbol slot has locational parameters corresponding to those of the instant vector or entity. The symbol recognition technique of the present invention makes it relatively easy for the user to define or recognize a wide variety of graphic symbols or isolated characters by allowing the user to select a relatively small number of unique features of a symbol or character or the like, geometrically define tests in the rule base decision tree to recognize that combination of unique features and thereby recognize the symbol, character or the like. The Inference engine is essentially independent of the kinds or types of symbols that are to be recognized. This allows the user great flexibility in defining rule bases by means of which his symbols, characters or the like can be recognized in accordance with the present invention. The technique of testing various permutations of subsymbols having recurring symbols is very simple compared to most prior techniques that involve computing and storing all possible permutations of a number of items because the present technique avoids the need to store all of the possible permutations, resulting in considerable savings in amount of memory required and increasing the speed of the symbol recognition process.

The prototype symbol recognition system described herein currently has a symbol recognition success rate of at least 70 percent, and in most cases, the recognition success rate has been nearly 90 percent. A few problems, such as erroneous recognition of certain symbols such as capacitor symbols where none exist is expected to be overcome by assignment of confidence levels to each node of the rule base decision tree, so that the user can specify the overall confidence level at which the symbol recognition value should proceed. The speed of recognition using the prototype symbol recognition system has been remarkably high. Most A-sized drawings, even ones that are very dense, require less than 20 seconds for symbol recognition while C-sized drawings require less than 60 seconds for the symbol recognition portion of the overall document recognition operation.

While the invention has been described with reference to a particular embodiment thereof, those skilled in the art will be able to make various modifications to the described embodiment of the invention without departing from the true spirit and scope thereof. It is intended that all elements and steps which perform substantially the same function in substantially the same manner to achieve the same result are within the scope of the invention For example, the procedure can be used not only for graphic symbols, but for various other kinds of symbols, such as handwritten characters and the like.

I claim:

1. A method of operating a computerized graphics system to recognize a graphic symbol, comprising the steps of:
    (a) providing a list of stored vectors produced by vectorizing a drawing or the like, including vectors of the graphic symbol to be recognized;
    (b) providing a rule base decision true including a plurality of different geometric tests for various features of the graphic symbol;
    (c) defining a window that effectively surrounds a graphic symbol to be recognized;
    (d) selecting a softward blackboard corresponding to the window;
    (e) operating on the stored vectors to form a linked list of vectors representative of features of the graphic symbol by fetching a vector from the list of stored vectors and inserting the vector into a symbol slot in the blackboard, the symbol slot having locational parameters that correspond to a location of the vector in the window, and creating the symbol slot with locational parameters that correspond to the location of the vector if the symbol slot does not already exist;
    (f) inserting the vector in a subsymbol slot in the symbol slot, and adding the vector to a linked list including a vector already in the subsymbol slot if there is one;
    (g) creating the subsymbol slot if there does not already exist a previous subsymbol slot into which the vector can be inserted, inserting the vector into the created subsymbol slot, and adding the created subsymbol slot to a linked list of subsymbol slots that includes the previous subsymbol slot;
    (h) creating a plurality of subsymbol slots in the course of fetching a plurality of vectors from the list of stored vectors and inserting subsymbol slots into the symbol slot, determining if certain portions of subsymbols in various subsymbol slots are sufficiently close to be merged, and if so, merging such subsymbols;
    (i) creating a plurality of symbol slots and subsymbol slots therein, respectively, in the course of fetching a plurality of vectors and inserting them into the blackboard, determining if any subsymbols in a first symbol slot are sufficiently close to subsymbols in a second symbol slot to be mergable with subsymbols in the first symbol slot, and if so, moving the mergable subsymbol from the second symbol slot to the first symbol slot; and
    (j) performing sequences of the different geometric tests on selected portions of the linked list at successive notes of the decision tree and producing a symbol identifier corresponding to the graphic symbol if a predetermined outcome of the tests occurs.

2. The method of claim 1 including creating the subsymbol slot if the immediately prior subsymbol slot in the same symbol slot contains a subsymbol including a linked list of vectors forming a closed loop.

3. The method of claim I wherein each of the subsymbol selects corresponds to a portion of memory space of the computerized graphics system and each symbol slot corresponds to a portion of memory space of the computerized graphics system.

4. The method of claim 1 wherein step (d) includes determining whether any types of subsymbols included in the linked list of subsymbol slots occur more than once, and if so, determining a number of possible permutations of symbols of the types which occur more than once.

5. The method of claim 1 or 4 including updating a guess variable with a symbol identifier at each node of the decision tree if the outcome of the sequence of geometric tests at that node has a predetermined outcome and that node of the decision tree has a symbol identifier associated therewith.

6. The method of claim 4 wherein a true or false outcome is associated with the performing of the sequence of geometric tests at each node of the decision tree, the method including backtracking to a first node if no more permutations are available at that node and performing another sequence of geometric tests at the node pointed to by a false outcome at the first node.

7. The method of claim 1 wherein step (b) includes converting a rule base consisting of a plurality of geometric tests for various subsymbols of a symbol into a decision tree having a plurality of nodes and a different group of geometric tests for each different feature at each node, respectively, and providing attribute information identifying each segment of the decision tree.

8. The method of claim 1 wherein the decision tree includes a plurality of nodes, step (d) including performing a different sequence of geometric tests on the linked list at each node of the decision tree, each sequence of geometric tests having an outcome that is true or false depending on which subsymbol slots or symbol slots are contained in the linked list, each true outcome determining which node of the decision tree is to be traversed next.

9. The method of claim 11 wherein the decision tree includes a plurality of nodes, step (d) including performing a different sequence of geometric tests on the linked list at each node of the decision tree, each sequence of geometric tests having an outcome that is true or false depending on which subsymbol slots or symbols are contained in the linked list, each true outcome determining which node of the decision tree is to be traversed next.

10. The method of claim 9 including backtracking if no further permutations of the linked list are possible and no true outcome is obtained for the present node, the backtracking including traversing the node of the decision tree pointed to by the false outcome of the last sequence of geometric tests and performing a new sequence of the geometric tests of that node on a portion of the linked list.

11. The method of claim 5 including sending the symbol identifier to a utilization program and using the symbol identifier to access a corresponding symbol in a symbol library, and using the accessed symbol with the vectorized data in the list of stored vectors.

12. The method of claim 11 including sending dimensional information to the utilization program with the symbol identifier to allow scaling of the accessed symbol.

13. The method of claim 7 including determining certain attributes of the linked list and comparing the linked list attributes to attributes of portions of the decision tree to select portions of the decision tree against which the linked list can be tested.

14. In a computerized graphics system, a symbol recognition system comprising in combination:

(a) a processor and a memory coupled to the processor;

(b) means in the memory for storing a list of stored vectors produced by vectorizing a drawing or the like, including vectors of the graphic symbol to be recognized;

(c) means in the memory for storing a rule base decision tree including a plurality of geometric tests for various features of the graphic symbol;

(d) means in the processor for defining a window that surrounds a relatively small region of the drawing containing the graphic symbol, wherein the linked list forming means includes means for selecting a software backboard that corresponds to the window;

(e) means in the processor for forming a linked list of vectors representative of features of the graphic symbol and storing the linked list in the memory, wherein the linked list forming means includes i. means coupled to the vector storing means for fetching a vector from the list of stored vectors and means responsive to the vector fetching means for inserting the vector into a symbol slot in the blackboard, the symbol slot having locational parameters that correspond to the location of the vector in the window, ii. means responsive to the vector fetching means for creating the symbol slot with locational parameters that correspond to the location of the vector if the symbol slot does not already exist, iii. means responsive to the vector fetching means for inserting the vector in a subsymbol slot in the symbol slot, and means for adding the vector to a linked list including a vector already in the subsymbol slot if there is one, iv. means responsive to the vector fetching means for creating the subsymbol slot if there does not already exist a previous subsymbol slot into which the vector can be inserted, means for inserting the vector into the created subsymbol slot, and means for adding the created subsymbol slot to a linked list of subsymbol slots that includes the previous subsymbol slot; and (f) means in the processor responsive to the linked list forming means for performing sequences of geometric tests on selected portions of the linked list at successive nodes of the decision tree and producing a symbol identifier corresponding to the graphic symbol if a predetermined outcome of the tests occurs.

15. The symbol recognition system of claim 14 wherein the linked list forming means includes means for creating the subsymbol slot if the immediately prior subsymbol slot in the same symbol slot contains a subsymbol including a linked list of vectors forming a closed loop.

16. The symbol recognition system of claim 14 wherein the linked list forming means includes means for creating a plurality of subsymbol slots in the course of fetching a plurality of vectors from the list of stored vectors and inserting the subsymbol slots into the symbol slot, means for determining if certain portions of subsymbols in various subsymbol slots are sufficiently close to be merged, ends for merging such subsymbols if such certain portions are sufficiently close to be merged.

17. The symbol recognition system of claim 16 wherein the linked list forming means includes means for creating a plurality of symbol slots and subsymbol slots therein, respectively, in the course of fetching a plurality of vectors and inserting them into the blackboard, and means for determining if any subsymbols in a first symbol slot are sufficiently close to subsymbols in a second symbol slot to be mergable with subsymbols in the first symbol slot, and if so, moving the mergable subsymbol from the second symbol slot to the first symbol slot.

18. The symbol recognition system of claim 14 wherein each of the subsymbol slots corresponds to a portion of memory space of the computerized graphics system and each symbol slot corresponds to a portion of memory space of the computerized graphics system.

19. The symbol recognition system of claim 16 wherein the geometric test sequence performing means includes means for determining whether any types of subsymbols included in the linked list of subsymbol slots occur more than once, and if so, determining a number of possible permutations of subsymbols of the types which occur more than once.

20. The symbol recognition system of claim 16 wherein the geometric test sequence performing means includes means for updating a guess variable with a symbol identifier at each node of the decision tree if the outcome of the sequence of geometric tests at that node has a predetermined outcome and that node of the decision tree has a symbol identifier associated therewith.

21. The symbol recognition system of claim 18 wherein a true or false outcome is associated with the performing of the sequence of steps at each node of the decision tree, the symbol recognition system including means in the processor for backtracking to a first node if no more permutations are untested at that node and performing another sequence of geometric tests at the node pointed to by a false outcome at the first node.

22. The symbol recognition system of claim 14 including means in the processor for converting a rule base consisting of a plurality of geometric tests for various subsymbols of a symbol into a decision tree having a plurality of nodes and a different group of geometric tests for each different feature at each node, respectively, and means in the processor for providing attribute information identifying each segment of the decision tree.

23. The symbol recognition system of claim 14 wherein the decision tree includes a plurality of nodes, and the geometric test sequence performing means includes means for performing a different sequence of geometric tests on the linked list at each node of the decision tree, each sequence of geometric tests having an outcome that is true or false depending on which subsymbol slots or symbol slots are contained in the linked list, each true outcome determining which node of the decision tree is to be traversed next.

24. The symbol recognition system of claim 23 wherein the decision tree includes a plurality of nodes, and the geometric test sequence performing means includes means for performing a different sequence of geometric tests on the linked list at each node of the decision tree, each sequence of geometric tests having an outcome that is true or false depending on which subsymbol slots or symbols are contained in the linked list, each true outcome determining which node of the decision tree is to be traversed next.

25. The symbol recognition system of claim 23 including means in the processor for backtracking if no further permutations of the linked list are possible and no true outcome is obtained for the present node, the backtracking means including means for traversing the node of the decision tree pointed to by the false outcome of the last sequence of geometric tests and performing a new sequence of the geometric tests of that node on a portion of the linked list.

26. The symbol recognition system of claim 19 including means in the processor for sending the symbol identifier to a utilization program and means for using the symbol identifier to access a corresponding symbol in a symbol library, and using the accessed symbol with the vectorized data in the list of stored vectors.

27. The symbol recognition system of claim 25 including means in the processor for sending dimensional information to the utilization program with the symbol identifier to allow scaling of the accessed symbol.

28. The symbol recognition of claim 22 including means in the processor for determining certain attributes of the linked list and comparing the linked list attributes to attributes of portions of the decision tree to select portions of the decision tree against which the linked list can be tested.

29. A method of operating a computerized graphic system to recognize graphic symbols, comprising the steps of:
 (a) providing a list of stored vectors produced by vectorizing a drawing or the like, including vectors of graphic symbols to be recognized;
 (b) providing a rule base decision tree including a plurality of nodes and a plurality of sequences of geometric tests for various subsymbol features which are performed at each node respectively, each sequence of geometric tests having a tree outcome and a false outcome that point to different depending nodes, respectively, of the decision tree;
 (c) defining a window that effectively surrounds a graphic symbol to be recognized;
 (d) selecting a software blackboard corresponding to the window;
 (e) fetching a vector from the stored vector list and inserting the vector into a subsymbol slot in a symbol slot located in the blackboard, the symbol slot having locational parameters that correspond to a location of the vector in the window, to form or add to a linked list of subsymbols;
 (f) determining if any subsymbol in a first symbol slot is sufficiently close to a subsymbol in a second symbol slot to be merged with the subsymbol in the first symbol slot, and if so, moving the mergeable subsymbol from the second symbol slot to the first symbol slot;
 (g) determining if any subsymbol in the first subsymbol slot can be merged, and if so merging them;
 (h) performing a sequence of geometric tests on the linked list of vectors if it forms a closed loop to recognize the closed loop subsymbol;
 (i) repeating steps (e) through (h) for all other vectors from the window, adding the vectors to the linked list or to one or more other linked lists that are formed during such repeating;
 (j) performing sequences of geometric tests on selected portions of the linked list at successive nodes on the decision tree, and producing a symbol identifier corresponding to the graphic symbol in the symbol slot if the geometric tests identify a symbol in the linked list;
 (k) determining if any type of subsymbol included in the linked list of subsymbol slots occurs more than once, and if so, determining a number of possible permutations of subsymbols of the type which occur more than once with other subsymbols in the linked list;
 (1) if no further permutations of the linked lists are possible and no true outcome is obtained for the present node, performing a sequence of geometric tests at the node pointed to by the false outcome of the sequence of geometric tests previously performed at the present node of the decision tree; and
 (m) if the sequence of geometric tests results in a symbol identifier being produced, sending the symbol identifier to a utilization program and using it to access a symbol library to obtain detailed data descriptive of the recognized graphic symbol.

30. A system for operating a computerized graphic system to recognize graphic symbols, comprising inn combination:
 (a) a processor and a memory;
 (b) means in the memory for storing a list of stored vectors produced by vectorizing a drawing or the like, including vectors of graphic symbols to be recognized;
 (c) means in the memory for storing a rule base decision tree including a plurality of nodes and a plurality of sequences of geometric tests for various subsymbol features which arc performed at each node, respectively, each sequence of geometric tests having a true outcome and a false outcome that point to different depending nodes, respectively, of the decision tree;
 (d) means in the processor for defining a window that effectively surrounds a graphic symbol to be recognized and storing the window in the memory:
 (e) means in the processor for selecting a software blackboard in the memory corresponding to the window;
 (f) means in the processor for fetching a vector from the stored vector list and means in the processor for inserting the vector into a subsymbol slot in a symbol slot located in the blackboard, the symbol slot having locational parameters that correspond to a location of the vector in the window to form or add to a linked list of subsymbols;
 (g) means in the processor responsive to the vector fetching means for determining if any subsymbol in a first symbol slot is sufficiently close to a subsymbol in a second symbol slot to be merged with the subsymbol in the first symbol slot, and if so, moving the mergable subsymbol from the second symbol slot to the first symbol slot;
 (h) means in the processor for determining if any subsymbols in the first subsymbol slot can be merged, and if so merging them;
 (i) means in the processor for performing a sequence of geometric tests on the linked list of vectors if it forms a closed loop to recognize the closed loop subsymbol;
 (j) means in the geometric test performing means for determining if any type of subsymbol included in the linked list of subsymbol slots occurs more than one, and if so, determining a number of possible permutations of the subsymbol of the type which occurs more that once with each subsymbols in the linked list;
 (l) means in the geometric test performing means for performing a sequence of geometric tests at the node pointed to by the false outcome of the sequence of geometric tests previously performed at the present node of the decision tree if no further permutations of the linked list are possible and no true outcome is obtained for the present node; and (m) means in the processor responsive to the geometric test performing means for sending the symbol identifier to a utilization program and using it to access a symbol library to obtain detailed data descriptive of the recognized graphic symbol, if the sequence of geometric tests results in a symbol identifier being produced.

* * * * *